United States Patent
Shiina et al.

(10) Patent No.: US 12,286,745 B2
(45) Date of Patent: Apr. 29, 2025

(54) JOINING JIG AND JOINING APPARATUS

(71) Applicant: JUKI CORPORATION, Tama (JP)

(72) Inventors: Takayuki Shiina, Tama (JP); Norihisa Shiraishi, Tama (JP); Takaaki Iijima, Tama (JP)

(73) Assignee: JUKI CORPORATION, Tama (JP)

( * ) Notice: Subject to any disclaimer, the term of this patent is extended or adjusted under 35 U.S.C. 154(b) by 124 days.

(21) Appl. No.: 18/116,514

(22) Filed: Mar. 2, 2023

(65) Prior Publication Data
US 2023/0279610 A1 Sep. 7, 2023

(30) Foreign Application Priority Data
Mar. 3, 2022 (JP) ................. 2022-032211

(51) Int. Cl.
| | | |
|---|---|---|
| *B65H 45/04* | (2006.01) | |
| *B05C 13/02* | (2006.01) | |
| *B29C 63/00* | (2006.01) | |
| *D06H 5/00* | (2006.01) | |
| *B29C 63/04* | (2006.01) | |

(52) U.S. Cl.
CPC ............ *D06H 5/001* (2013.01); *B05C 13/02* (2013.01); *B29C 63/0034* (2013.01); *B65H 45/04* (2013.01); *B29C 63/046* (2013.01); *Y10T 156/1051* (2015.01)

(58) Field of Classification Search
CPC .... D05B 35/062; D05B 35/04; B29C 63/046; B29C 63/0034; B65H 45/00; B65H 45/04; Y10T 156/1051

USPC ..................... 156/227, 477.1, 492
See application file for complete search history.

(56) References Cited

U.S. PATENT DOCUMENTS

| | | | |
|---|---|---|---|
| 4,410,575 A | 10/1983 | Obayashi et al. | |
| 5,098,508 A * | 3/1992 | Mattil ..................... | A43D 5/02 269/21 |

(Continued)

FOREIGN PATENT DOCUMENTS

| | | | | |
|---|---|---|---|---|
| EP | 0006080 A1 * | 12/1979 | ............... | E04F 15/00 |
| EP | 3 037 245 B1 | 5/2018 | | |

(Continued)

OTHER PUBLICATIONS

English machine translation for WO2016102085 (Year: 2016).*

(Continued)

*Primary Examiner* — Scott W Dodds
(74) *Attorney, Agent, or Firm* — Faegre Drinker Biddle & Reath LLP

(57) ABSTRACT

In a joining jig for disposing a sheet-shaped adherend on one surface side of a sheet-shaped material, folding back the adherend in an end edge portion of the sheet-shaped material, and causing adhesion of an end edge portion of the adherend on the other surface side on the sheet-shaped material, by a tip portion of an attachment piece pivoting in the end edge portion of a placement surface of a placement base, the attachment piece is switchable between a deployment position where an attachment surface to which the adherend is attached is deployed outside the end edge portion of the placement surface of the placement base and a facing position where the attachment surface faces the end edge portion of the placement surface.

10 Claims, 14 Drawing Sheets

(56) References Cited

U.S. PATENT DOCUMENTS

| | | | | |
|---|---|---|---|---|
| 5,247,769 | A | * 9/1993 | Becker | ............... E04D 13/1407 |
| | | | | 52/716.8 |
| 6,358,644 | B1 | 3/2002 | Shibata et al. | |
| 2016/0089870 | A1* | 3/2016 | Coenen | .............. B29C 63/0034 |
| | | | | 156/212 |
| 2020/0282634 | A1 | 9/2020 | Smith et al. | |

FOREIGN PATENT DOCUMENTS

| | | | | |
|---|---|---|---|---|
| JP | S57-042969 A | 3/1982 | | |
| WO | WO-2016102085 A1 | * 6/2016 | ............. | B29C 63/04 |

OTHER PUBLICATIONS

Extended European Search Report issued Sep. 7, 2023 in Application No. 23159473.0.
Corrected page of European Search Report issued Jan. 30, 2024 in Application No. 23159473.0.
European Communication pursuant to Article 94(3) EPC issued Oct. 2, 2024 in Application No. 23159473.0.

\* cited by examiner

JOINING JIG AND JOINING APPARATUS

CROSS-REFERENCE TO RELATED APPLICATIONS

This application is based on and claims priority under 35 USC 119 from Japanese Patent Application No. 2022-032211 filed on Mar. 3, 2022.

TECHNICAL FIELD

The present invention relates to a joining jig and a joining apparatus used for joining a sheet-shaped material.

BACKGROUND ART

In the related art, joining by adhesion is used as a method for joining a sheet-shaped material such as a cloth (see, for example, JPS57-42969A).

SUMMARY OF INVENTION

As an example of joining a sheet-shaped material, there is an application in which an adherend made of another sheet-shaped material is disposed on the front surface of one sheet-shaped material, the adherend is folded back to the back surface side of the sheet-shaped material along the end edge portion of the sheet-shaped material, and adhesion is performed along the end edge portion on the back surface side of the sheet-shaped material to join the adherend such that the adherend covers the sheet-shaped material.

In the joining described above, the work of folding back can be performed with ease in a case where the entire end edge portion of the workpiece where the adherend is folded back is linear. However, in a case where the end edge portion of the workpiece is curved or has the shape of a plurality of connected straight lines, the work of folding back and adhesion is very complicated and difficult, which leads to the problem of very large work burden.

Aspect of non-limiting embodiments of the present disclosure relates to provide a joining jig and a joining apparatus that can facilitate the work of folding back an adherend and causing adhesion along the end edge portion of a sheet-shaped material.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a joining jig for disposing a sheet-shaped adherend on one surface side of a sheet-shaped material, folding back the adherend in an end edge portion of the sheet-shaped material, and causing adhesion of an end edge portion of the adherend on the other surface side of the sheet-shaped material, the joining jig including:

a placement base that has a placement surface where the sheet-shaped material is placed to be superimposed on the adherend, an end edge portion of the placement surface being formed in a shape corresponding to the end edge portion of the sheet-shaped material; and a plurality of attachment pieces to which the adherend is attached and that are disposed side by side along the end edge portion of the placement base, wherein, by a tip portion of the attachment piece pivoting in the end edge portion of the placement surface of the placement base, the attachment piece is switchable between a deployment position where an attachment surface to which the adherend is attached is deployed outside the end edge portion of the placement surface of the placement base and a facing position where the attachment surface faces the end edge portion of the placement surface.

According to another aspect of the present disclosure, there is provided a joining apparatus including:

the joining jig according to the above; and a switching section that switches the plurality of attachment pieces of the joining jig between the deployment position and the facing position.

According to the present invention, it is possible to facilitate the work of folding back an adherend and causing adhesion along the end edge portion of a sheet-shaped material.

DESCRIPTION OF EMBODIMENTS

Hereinafter, as an embodiment of the present invention, a joining apparatus 100 used in joining an adherend C to a sheet-shaped material S by adhesion will be described with reference to the drawings.

Exemplified in the present embodiment is a case where the sheet-shaped adherend C is disposed on one surface (front surface) side of the sheet-shaped material S, an end edge portion C1 of the adherend C is folded back in an end edge portion S1 of the sheet-shaped material S, and adhesion of the end edge portion C1 of the adherend C is performed on the other surface (back surface) side of the sheet-shaped material S.

Sheet-shaped Material and Adherend

Figure 17A:
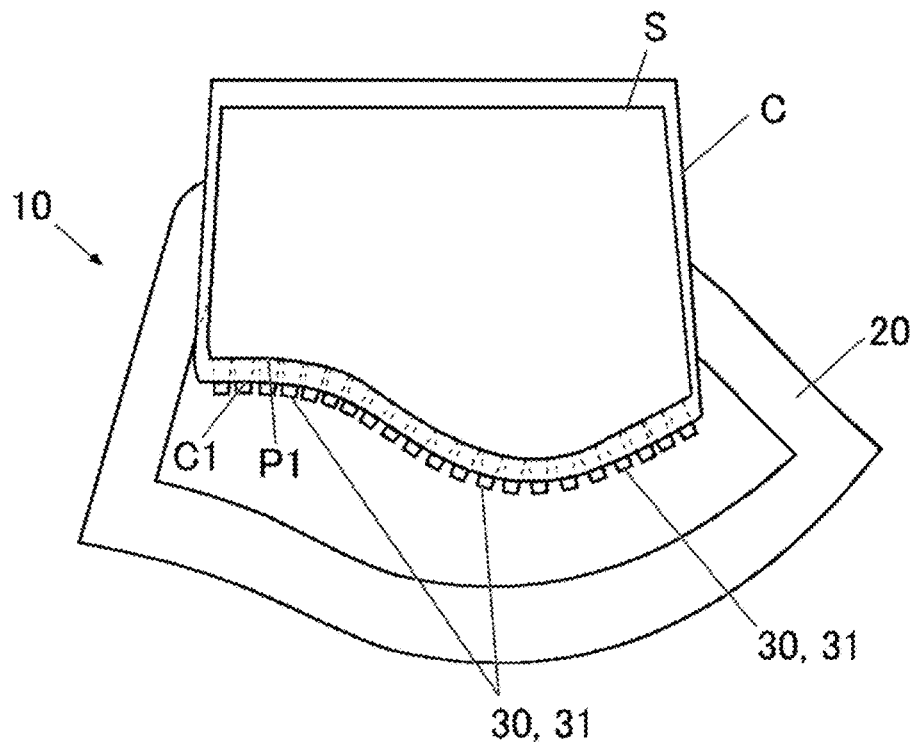
FIG. 17A is a plan view of the surroundings of the placement base during the joining operation following FIG. 16B.
Figure 17B:
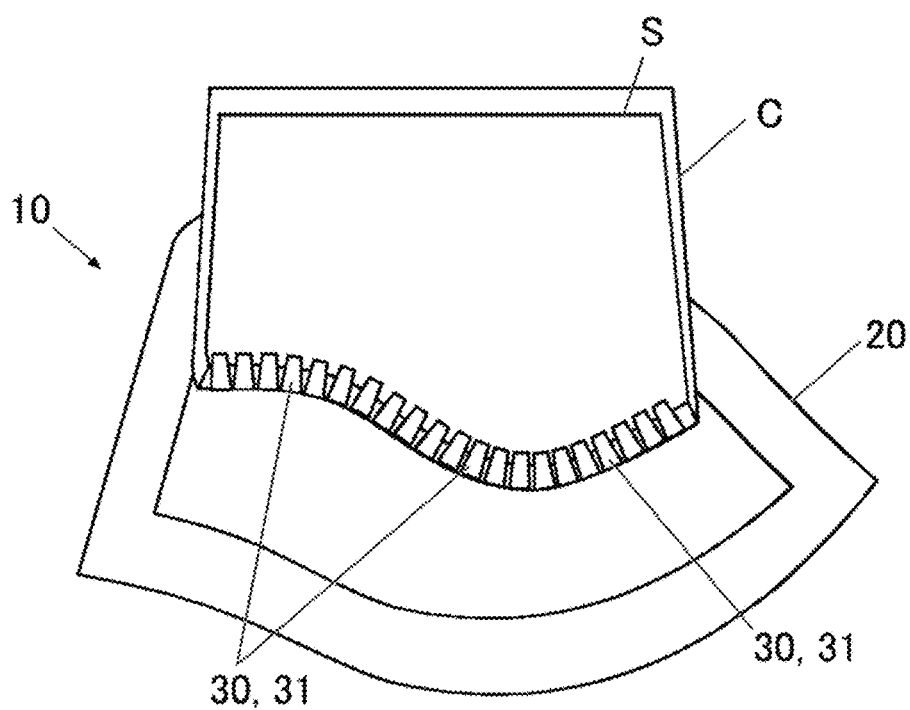
FIG. 17B is a plan view of the surroundings of the placement base during the joining operation following FIG. 17A.

The sheet-shaped material S and the adherend C will be described with reference to FIGS. 17A and 17B. In FIGS. 17A and 17B, the back surface of the sheet-shaped material S faces the front side of the paper surface.

The adherend C is superimposed on the lower side of the sheet-shaped material S, that is, the front surface side, the end edge portion C1 of the adherend C is folded back to the back surface side in the end edge portion S1 of the sheet-shaped material S, and adhesion of the end edge portion C1 of the adherend C that is folded back to the back surface side of the sheet-shaped material S is performed. As a result, the adherend C can be joined to the sheet-shaped material S with the adherend C covering the front surface side of the sheet-shaped material S.

Although a case where the end edge portion S1 of the sheet-shaped material S has a curved shape is exemplified, the end edge portion S1 of the sheet-shaped material S may have a linear shape or a non-linear shape. For example, the end edge portion S1 of the sheet-shaped material S may have a shape in which a plurality of straight lines that are different in direction are connected. Here, more specifically, it is exemplified that the end edge portion S1 has a substantially S-shaped curved shape in which the orientation of the unevenness changes.

The adherend C as a whole is larger than the sheet-shaped material S. The end edge portion C1 of the adherend C is similar in shape to the end edge portion S1 of the sheet-shaped material S and, as a whole, slightly larger in size than the end edge portion S1 of the sheet-shaped material S.

The adherend C is a sheet body such as a thin cloth that can be easily folded back. Although a case where the sheet-shaped material S is a material that is rigid to the extent of being fixable in form to a certain degree is exemplified, the joining apparatus 100 is capable of performing joining satisfactorily even with a thin cloth that is low in form fixability as in the case of the adherend C.

In addition, the sheet-shaped material S may have a curved surface shape although a case where the sheet-shaped material S has a planar shape is exemplified.

Joining Apparatus

Figure 1:
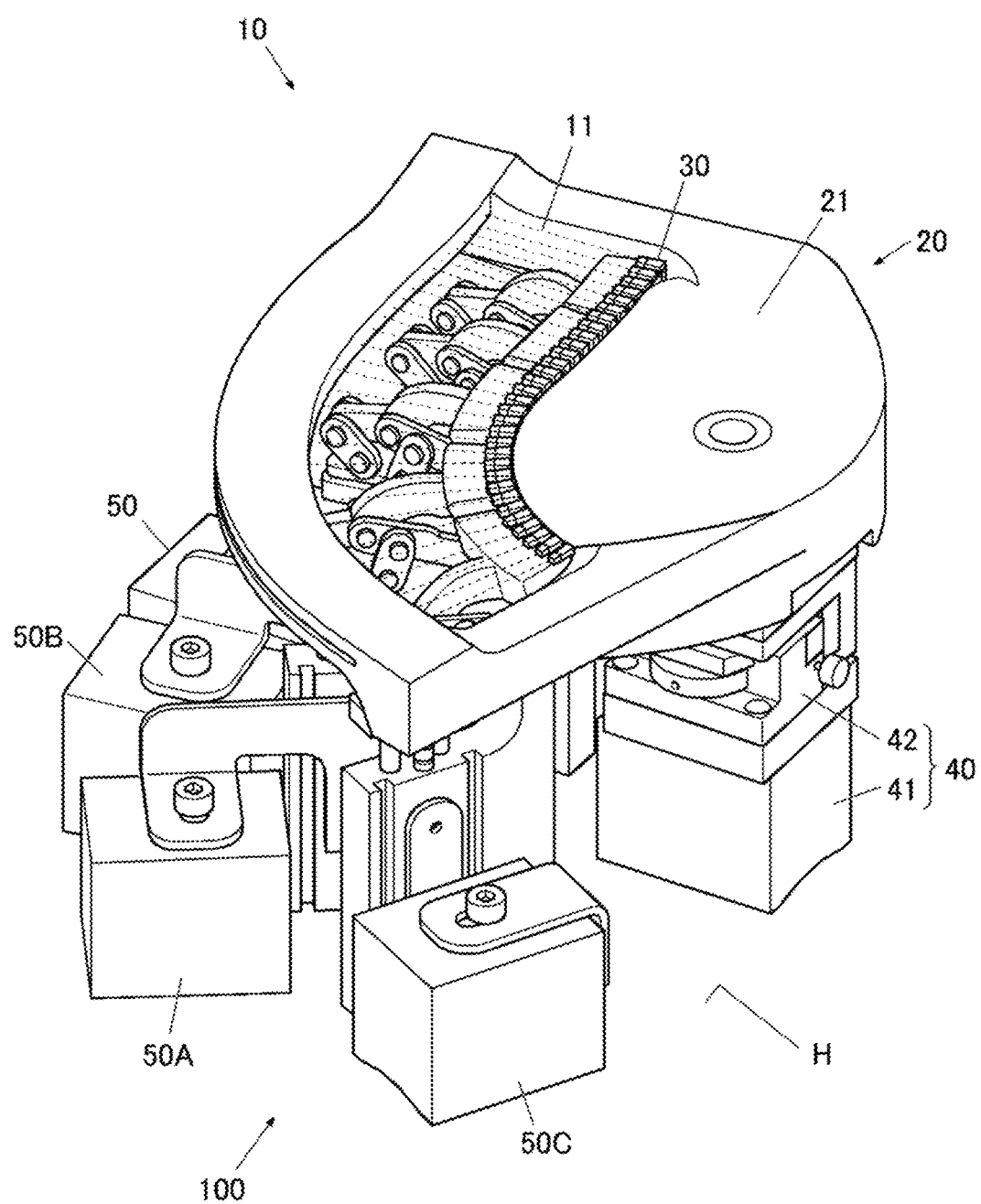
FIG. 1 is a perspective view of a joining apparatus as an embodiment of the present invention.

FIG. 1 illustrates a perspective view of the joining apparatus 100 that is an embodiment of the present invention.

It is to be noted that in the following description, the direction of each portion will be described on the assumption that the joining apparatus 100 is installed on a horizontal mounting surface H.

As illustrated in the drawing, the joining apparatus 100 has a joining jig 10 and a plurality of switching mechanisms 50, 50A, 50B, and 50C.

Joining Jig

The joining jig 10 includes a placement base 20 having a placement surface 21 placed with the sheet-shaped material S superimposed on the adherend C and the front surface of the sheet-shaped material S facing downward, a plurality of attachment pieces 30 to which the adherend C is attached, which are disposed side by side along an end edge portion 22 of the placement base 20, and a support base 40 for installing the placement base 20 on the mounting surface H such that the placement surface 21 is substantially horizontal. As for the placement base 20, the end edge portion 22 of the placement surface 21 is formed in a shape corresponding to (for example, matching) the end edge portion S1 of the sheet-shaped material S.

Joining Jig: Placement Base

Figure 2:
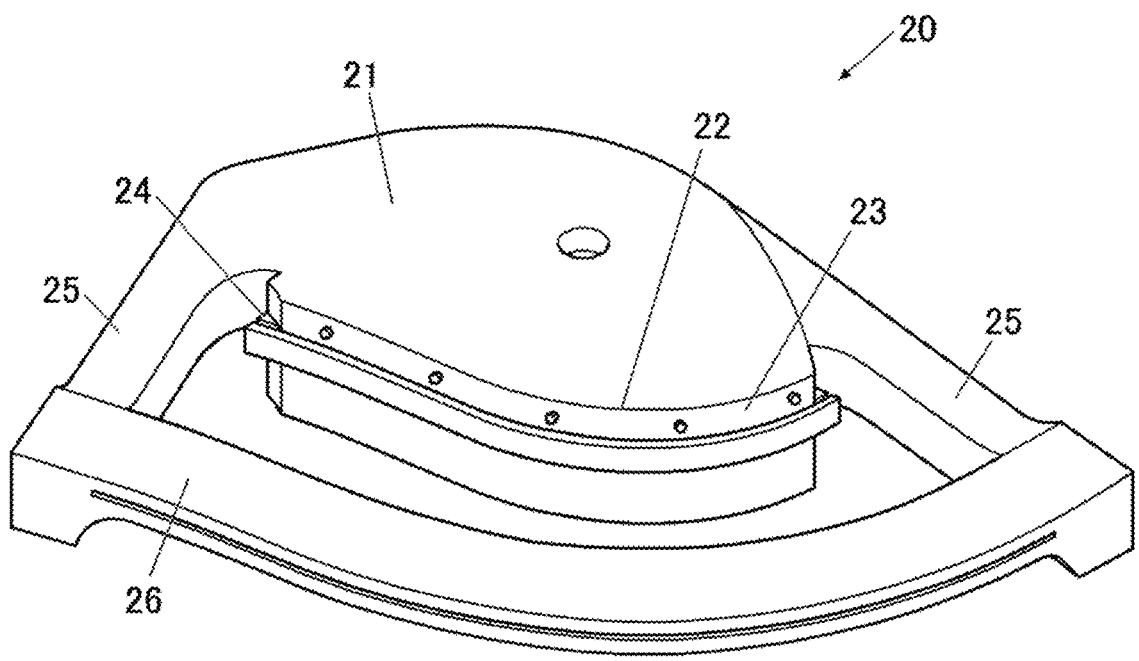
FIG. 2 is a perspective view of a placement base.
Figure 3:
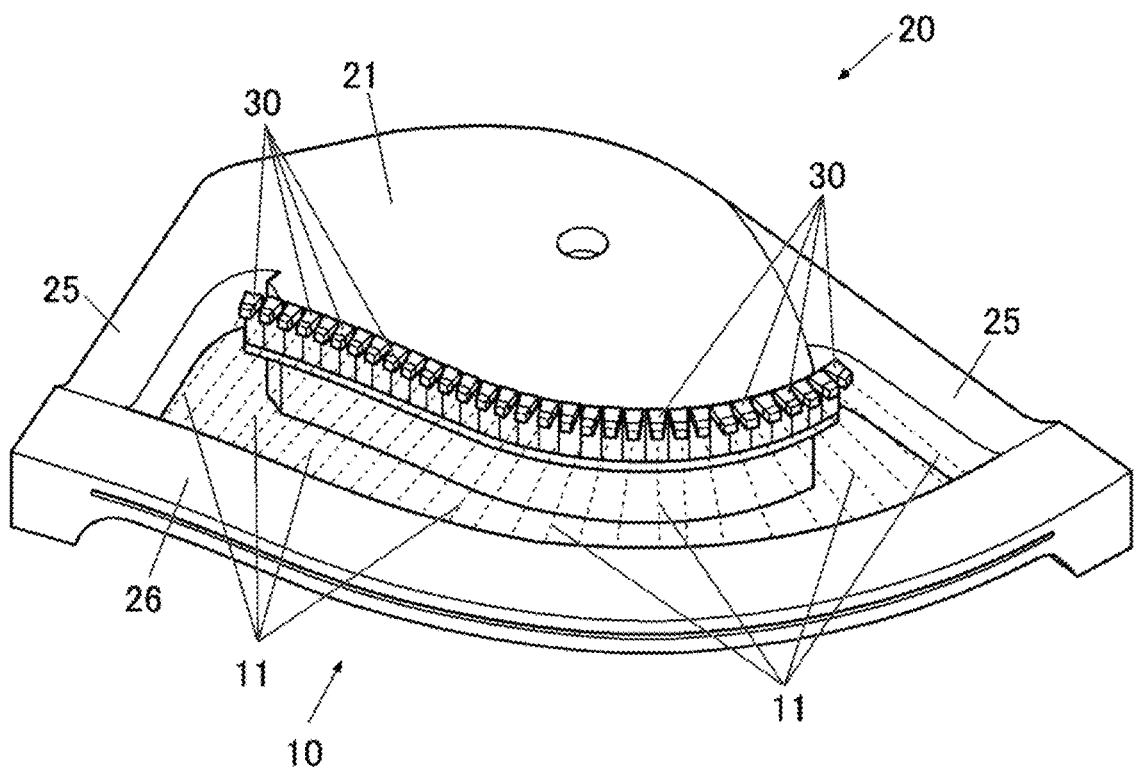
FIG. 3 is a perspective view of the placement base in a state where a plurality of attachment pieces are attached.

FIG. 2 illustrates a perspective view of the placement base 20, and FIG. 3 illustrates a perspective view of the placement base 20 in a state where the plurality of attachment pieces 30 are attached.

The placement base 20 is a columnar body, the plan-view shape of which is the shape of the placement surface 21. A pair of arm portions 25 are provided on both sides of the placement base 20. The pair of arm portions 25 support both end portions of a suspension body 26, which faces the end edge portion 22 of the placement surface 21 over the entire length of the end edge portion 22. The suspension body 26 holds one end portion of a plurality of rubber cords 11, which will be described later.

Although the placement surface 21 is a horizontal flat surface, in a case where the sheet-shaped material S has a curved surface shape, the placement surface 21 may have a curved surface shape corresponding thereto. In addition, the end edge portion 22 of the placement surface 21 has a shape that matches the shape of the end edge portion S1 of the sheet-shaped material S to which the adherend C is joined in plan view. During the joining work, the end edge portion S1 of the sheet-shaped material S is placed on the end edge portion 22 of the placement surface 21 in a state of being superimposed. It is to be noted that although the sheet-shaped material S is superimposed on the adherend C and thus direct visual recognition of the end edge portion 22 of the placement surface 21 may be impossible in some cases, a step is formed along the end edge portion 22 by the plurality of attachment pieces 30 being disposed along the end edge portion 22 of the placement surface 21, and thus it is possible to accurately place the sheet-shaped material S in alignment with the end edge portion 22 of the placement surface 21.

In order to implement the placement surface 21 having the above shape, the placement base 20 can be formed by, for example, preparing or three-dimensionally measuring plan-view shape data or three-dimensional data on the sheet-shaped material S and using a three-dimensional printer based on the data.

The pair of arm portions 25 extend in the direction along the placement surface 21 and away from the end edge portion 22 in both end portions of the end edge portion 22 of the placement surface 21.

Further, the pair of arm portions 25 respectively support one end portion and the other end portion of the suspension body 26 in the extension end portions thereof.

The suspension body 26 is an elongated body that has a shape along the end edge portion 22 of the placement surface 21 and a size somewhat enlarged from the end edge portion 22. One end portion of the rubber cord 11 as a biasing section (illustrated by a dotted line in FIG. 3) is connected to a tip portion of each of the plurality of attachment pieces 30 disposed side by side along the end edge portion 22 of the placement surface 21. The suspension body 26 holds the other end portion of the rubber cord 11 extending from the tip portion of each attachment piece 30 in a direction away from the end edge portion 22 and imparts tension to the suspension body 26 side to each attachment piece 30.

Joining Jig: Attachment Piece

Figure 4A:
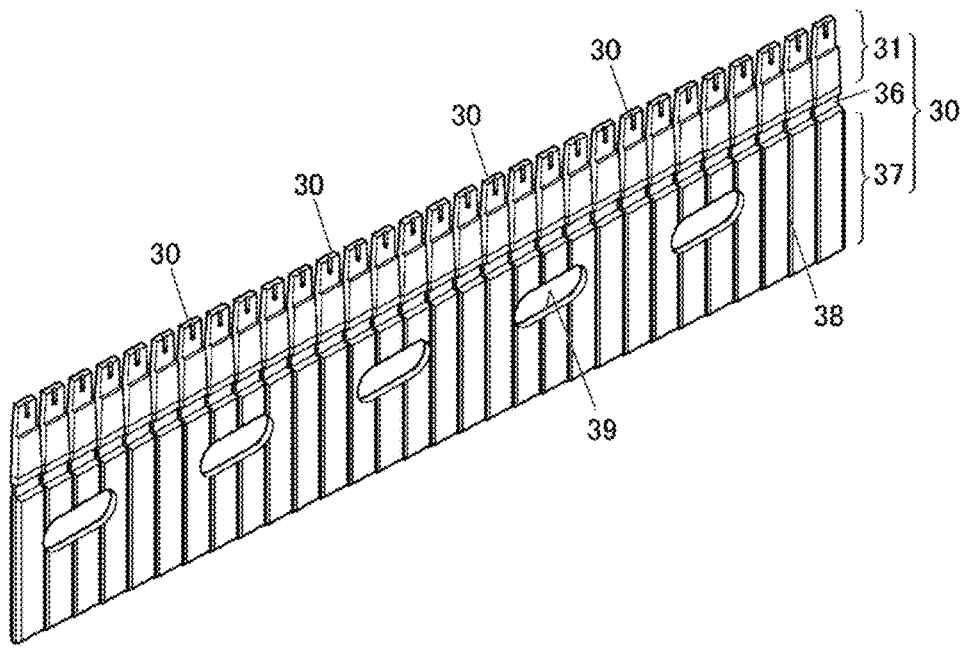
FIG. 4A is a perspective view of the plurality of attachment pieces.
Figure 4B:
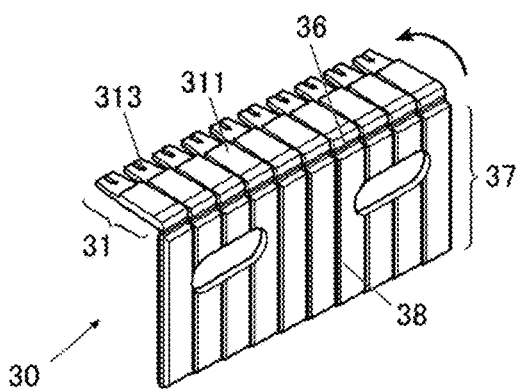
FIG. 4B is a perspective view of each attachment piece at a deployment position.
Figure 4C:
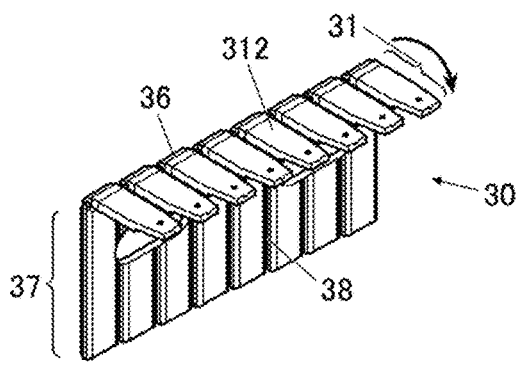
FIG. 4C is a perspective view of each attachment piece at a facing position.
Figure 5B:
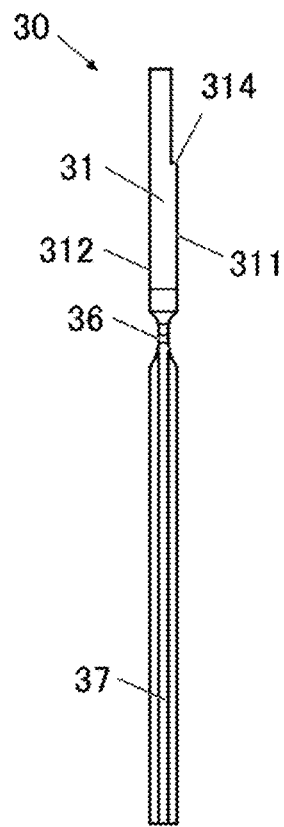
FIG. 5B is a side view.
Figure 5A:
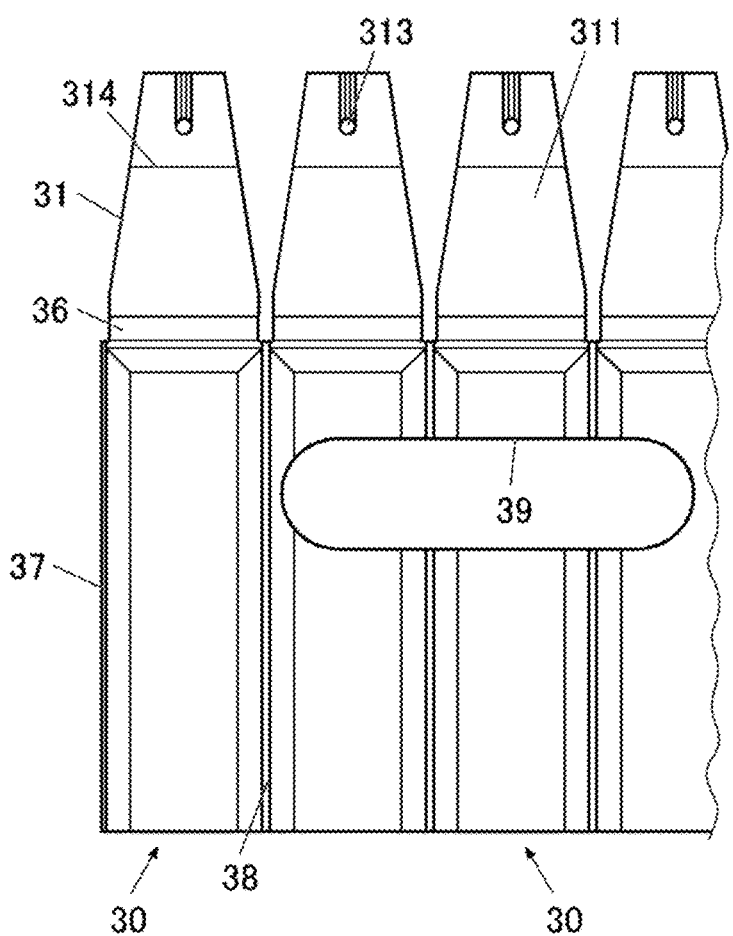
FIG. 5A is a front view of the plurality of attachment pieces.
Figure 5C:
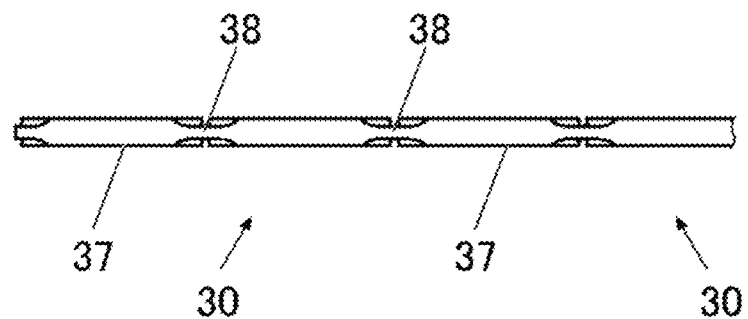
FIG. 5C is a bottom view.

FIG. 4A is a perspective view of the plurality of attachment pieces 30, FIG. 4B is a perspective view of each attachment piece 30 at a deployment position, and FIG. 4C is a perspective view of each attachment piece 30 at a facing position. In addition, FIG. 5A is a front view of the plurality of attachment pieces 30, FIG. 5B is a side view, and FIG. 5C is a bottom view.

The attachment piece 30 includes a pivoting portion 31 having an attachment surface 311 to which the adherend C is attached and a support portion 37 attached to the placement base 20. The attachment piece 30 is attached to a mounting surface 23 of the placement base 20 in a state where the support portions 37 of the plurality of attachment pieces 30 are connected and arranged in a row along the end edge portion 22 of the placement surface 21. The mounting surface 23 is a surface adjacent to the placement surface 21 via the end edge portion 22 and is a curved surface along the up-down direction facing the suspension body 26 described above.

It is to be noted that it is preferable to reduce the width of each attachment piece 30 to increase the number of individuals of the attachment pieces 30 arranged in a row along the end edge portion 22 of the placement surface 21. This is because the attachment piece 30 can be disposed so as to be closer to the shape of the end edge portion 22 as the attachment piece 30 decreases in width and the number of individuals increases.

The support portion 37 of the attachment piece 30 is a rectangular flat plate body elongated in the up-down direction, and a groove-shaped flexible portion 38 along the up-down direction is formed at the boundary between the support portions 37 of the attachment pieces 30 that are adjacent to each other. It is to be noted that each of the plurality of attachment pieces 30 is integrally formed of a flexible and elastic resin material such as polypropylene and the flexible portion 38 is much more flexible than the surroundings by being thin in a vertical stripe shape along the vertical direction. By the flexible portion 38, the plurality of attachment pieces 30 can be attached to the mounting surface 23 in a state of being arranged to follow the curved end edge portion 22.

It is to be noted that reference numeral 39 denotes a plurality of mounting holes penetrating the plurality of support portions 37 integrally arranged along the end edge portion 22. The plurality of attachment pieces 30 can be collectively attached to the mounting surface 23 by screws (not illustrated) respectively inserted through the mounting holes 39.

A groove 24 is provided along the lower end portion of the mounting surface 23 below the mounting surface 23, and the lower end portion of the support portion 37 of each attachment piece 30 attached to the mounting surface 23 can be inserted. As a result, each attachment piece 30 becomes more accurately along the mounting surface 23 and each pivoting portion 31 becomes more accurately arranged along the end edge portion 22 of the placement surface 21. In addition, the attachment pieces 30 can be uniform in height.

In the upper end portion of the support portion 37, the pivoting portion 31 is provided via a bent portion 36 as a groove-shaped constriction along the horizontal direction. As described above, the attachment piece 30 is integrally formed of a flexible and elastic resin material, and the bent portion 36 is much more flexible than the surroundings by being thin in a horizontal stripe shape along the horizontal direction. Further, as for the pivoting portion 31 in a state where no external force is applied, the pivoting portion 31 and the support portion 37 are arranged on a straight line along the up-down direction (neutral position) by the elasticity of the bent portion 36.

The pivoting portion 31 gradually decreases in width and is tapered from the lower end portion on the support portion 37 side toward the upper end portion. A connecting hole 313 is formed in the upper end portion of the pivoting portion 31 to hold one end portion of the rubber cord 11.

In addition, as for the pivoting portion 31, the substantially flat plate-shaped flat surface facing the mounting surface 23 of the placement base 20 is the attachment surface 311 to which the adherend C is attached, and the flat surface on the opposite side is a pressure receiving surface 312 pressed by the switching mechanism 50, 50A, 50B, or 50C, which will be described later.

Strictly speaking, a step 314 is formed in the vicinity of a tip portion of the pivoting portion 31, and the support portion 37 side beyond the step 314 is the attachment surface 311 to which the adherend C is attached. The step 314 is a reference line for aligning the tip portion of the end edge portion C1 of the adherend C during joining.

As will be described later, as for the attachment surface 311 in performing joining, a double-sided tape is attached or an adhesive is applied to impart attachability for attaching the adherend C. It is to be noted that the attachability of the attachment surface 311 may be imparted by any method insofar as the adherend C can be separated with a certain amount of force. For example, static electricity or the like may be used to attach the adherend C.

By the bent portion 36, each pivoting portion 31 can be pivoted by at least 90 degrees forward and backward from the neutral position.

Further, the pivoting portion 31 is switchable between the deployment position where the attachment surface 311 is outside the end edge portion 22 of the placement surface 21 of the placement base 20 and the pivoting portion 31 is deployed in a direction away from the end edge portion 22 (state where the tip portion of the pivoting portion 31 faces the suspension body 26 side: FIG. 4B) and the facing position where the attachment surface 311 faces the end edge portion 22 of the placement surface 21 (state where the attachment surface 311 faces downward: FIG. 4C).

It is to be noted that the pivoting portion 31 is normally maintained at the deployment position since the tip portion of the pivoting portion 31 is always under tension to the suspension body 26 side by the rubber cord 11 as described above.

Each attachment piece 30 is attached to the mounting surface 23 of the placement base 20 at a height where the upper end portion of the support portion 37 protrudes somewhat above the placement surface 21. Therefore, even in a state where the pivoting portion 31 of every attachment piece 30 is at the deployment position, the end edge portion S1 of the sheet-shaped material S can be accurately aligned with the end edge portion 22 of the placement surface 21 with respect to the placement surface 21 by the plurality of protruding support portions 37.

In addition, although the adherend C is placed first on the placement surface 21 during joining, the end edge portion C1 of the adherend C is affixed to the attachment surface 311 in alignment with the step 314 of each pivoting portion 31 as described above. Further, the adherend C is disposed in a state of being along the flat surface on the mounting surface 23 side in the upper end portion of the support portion 37 and the placement surface 21 via the bent portion 36 bent from the attachment surface 311 to the deployment position side (see FIG. 12B).

As illustrated in FIG. 5B, the bent portion 36 of each attachment piece 30 is formed so as to be sufficiently smaller in thickness (thickness in the direction perpendicular to the flat plate surface of the attachment piece 30) than the pivoting portion 31 and the support portion 37 as a result of the constricted shape. For this reason, the slackness of the adherend C attached to the bent portion 36 can be minimized in a case where the pivoting portion 31 pivots up to the facing position with the adherend C attached to the attachment piece 30 that is at the deployment position.

Figure 6A:
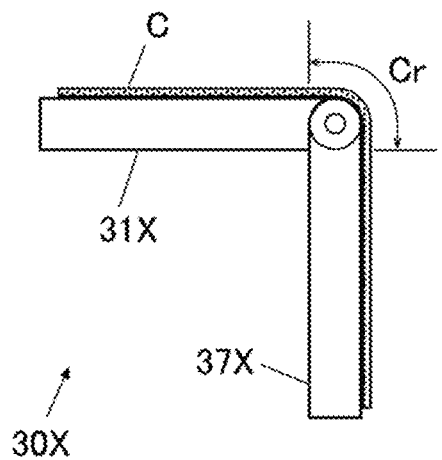
FIG. 6A illustrates a state where an adherend is attached in a state where an attachment piece as a comparative example in which a bent portion is not thin is at the deployment position.
Figure 6B:
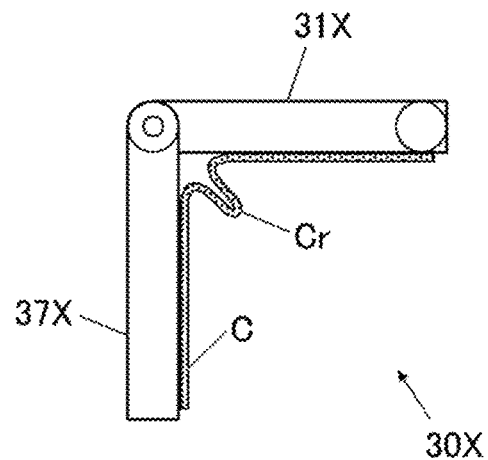
FIG. 6B illustrates the state of slackness of the adherend caused by pivoting to the facing position.

FIG. 6A illustrates a state where the adherend C is attached with an attachment piece 30X as a comparative example in which the bent portion is not thin at the deployment position, and FIG. 6B illustrates the state of slackness of the adherend C caused by pivoting to the facing position.

Exemplified is a case where a mechanical hinge structure as an example is adopted as the bent portion of the attachment piece 30X. In general, in the case of the hinge structure, the thickness of the hinge part is approximately equal to or equal to or greater than the thicknesses of the other parts (pivoting portion 31X and support portion 37X).

In a state of being at the deployment position, the adherend C is attached along the outer periphery of the bent portion. When the pivoting portion 31X pivots up to the facing position in that state, the portion attached along the outer periphery of the bent portion becomes a slack Cr of the adherend C as it is. For this reason, the slack Cr attributable to the portion of the adherend C attached along the outer periphery of the bent portion can be shortened as the width of the bent portion is reduced.

In other words, in the case of the bent portion 36 smaller in thickness than the other parts as a result of the constricted shape of the attachment piece 30, it is possible to minimize the slackness that is based on the adherend C attached to the bent portion 36.

Joining Jig: Support Base

The support base 40 has a base portion 41 that can be adsorbed to the mounting surface H and an adjustment portion 42 that performs support such that the position of the placement base 20 can be adjusted above the base portion 41.

Although the base portion 41 may be adsorbable to the mounting surface H using pneumatic pressure, a structure in which a permanent magnet is incorporated and adsorption to the mounting surface H as a magnetic body is performed by magnetic force is exemplified here. The base portion 41 includes an operation portion (not illustrated) such as a handle and a knob capable of changing the orientation and position of the incorporated permanent magnet and has a structure switchable between an adsorbable state and a non-adsorption state.

The adjustment portion 42 has two slide mechanisms allowing the placement base 20 to be moved and adjusted in two directions that are horizontal and orthogonal to each other, and each slide mechanism includes a fastening screw performing fixing at the post-adjustment position. As a result, the placement base 20 can be adjusted to any position on a horizontal surface.

It is to be noted that since the base portion 41 can be adsorbed in any orientation at any position on the mounting surface H, the adjustment portion 42 performs, for example, fine adjustment with respect to a position adsorbed by the base portion 41.

Switching Mechanism

Figure 7:
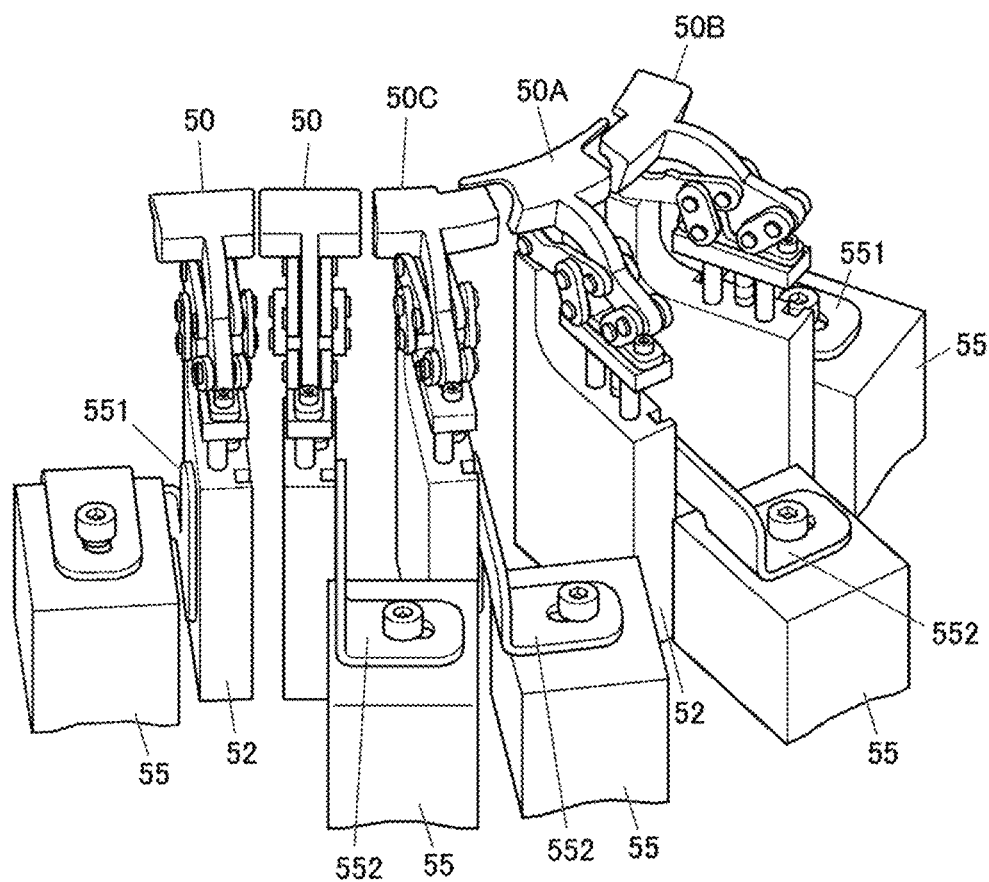
FIG. 7 is a perspective view of every switching mechanism installed in the joining apparatus.

FIG. 7 is a perspective view of every switching mechanism 50, 50A, 50B, and 50C (hereinafter, collectively referred to as "switching mechanisms 50 and so on" in some cases) installed in the joining apparatus 100.

Each of these switching mechanisms 50 and so on makes it possible to switch the pivoting portions 31 of the attachment pieces 30 successively arranged as a group from the deployment position to the facing position. It is to be noted that the rubber cord 11 described 10 above performs the facing position-to-deployment position switching of the pivoting portion 31 of the attachment piece 30. Therefore, a switching section is configured by the switching mechanisms 50 and so on and the rubber cord 11.

Each of the switching mechanisms 50 and so on switches the positions of the attachment pieces 30 as a group. As a result, position switching can be performed on every attachment piece 30 attached to the placement base 20.

The switching mechanisms 50, 50A, 50B, and 50C are different only in part with the configurations thereof mostly identical, and thus the switching mechanism 50 will be described first and only the differences from the switching mechanism 50 will be described as to the switching mechanisms 50A, 50B, and 50C. In addition, as to the switching mechanisms 50, 50A, 50B, and 50C, the identical configurations will be denoted by the same reference numerals with only the different configurations denoted by unique reference numerals.

Figure 8:
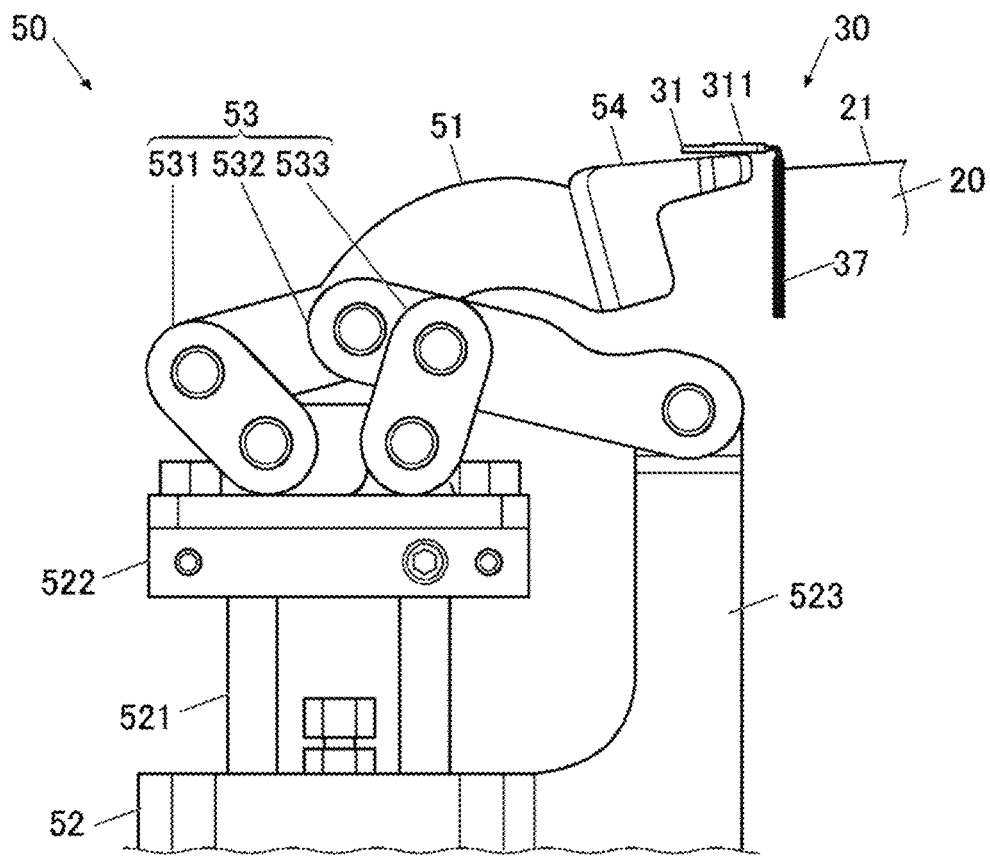
FIG. 8 is a side view illustrating a state where the switching mechanism is on standby before a position switching operation is executed with respect to the attachment piece.
Figure 9:
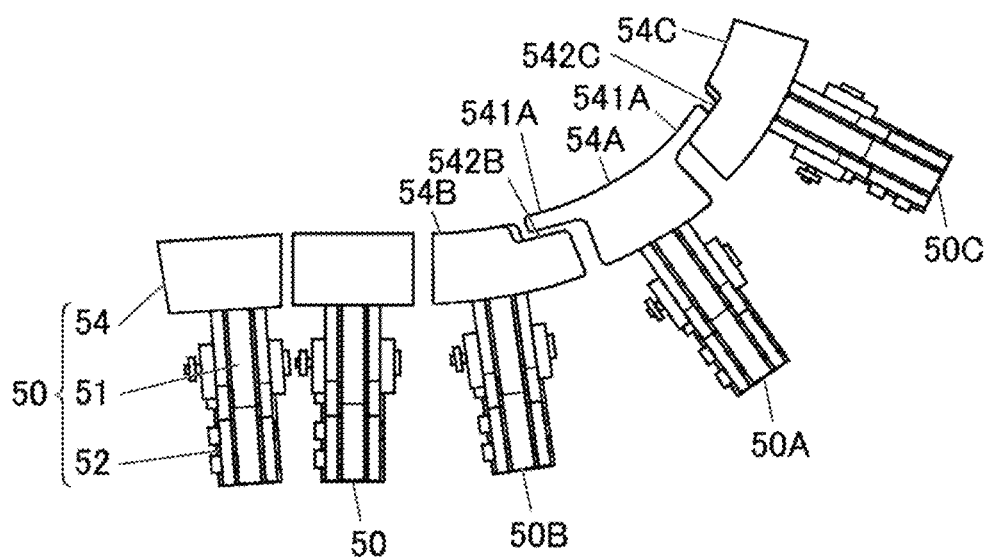
FIG. 9 is a plan view of a state where every switching mechanism is on standby after installation.
Figure 10:
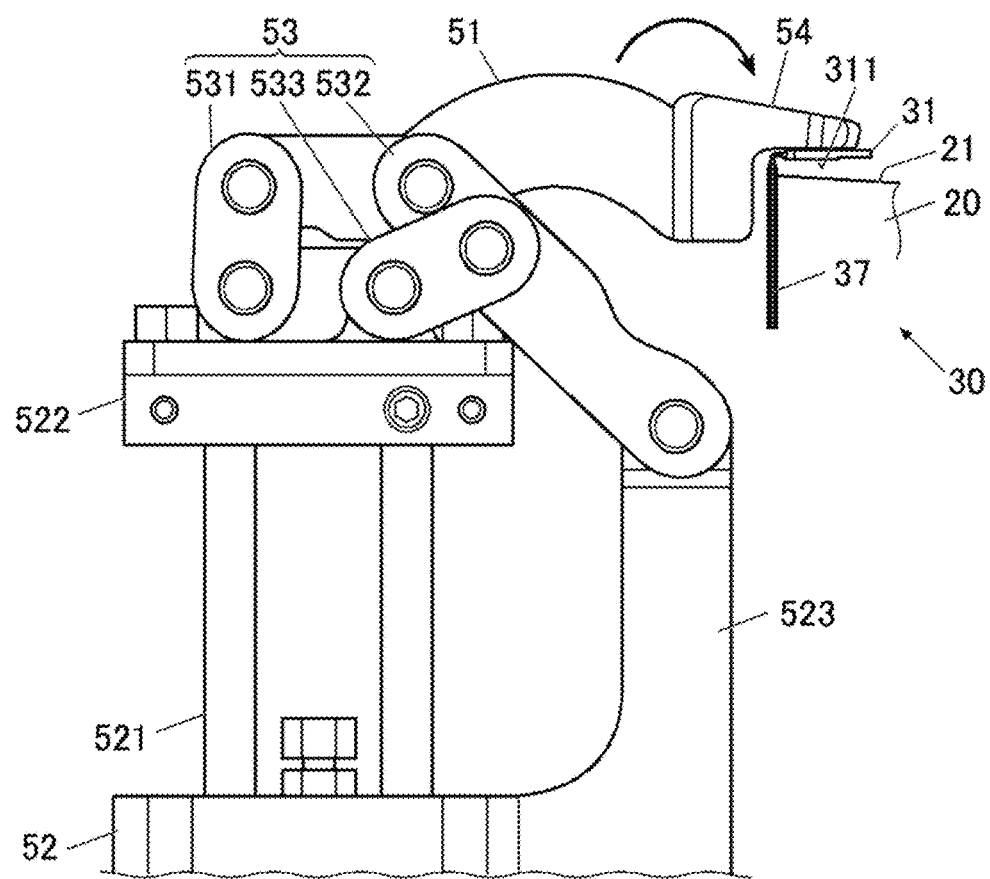
FIG. 10 is a side view illustrating a state where the switching mechanism is in operation after the position switching operation is executed with respect to the attachment piece.
Figure 11:
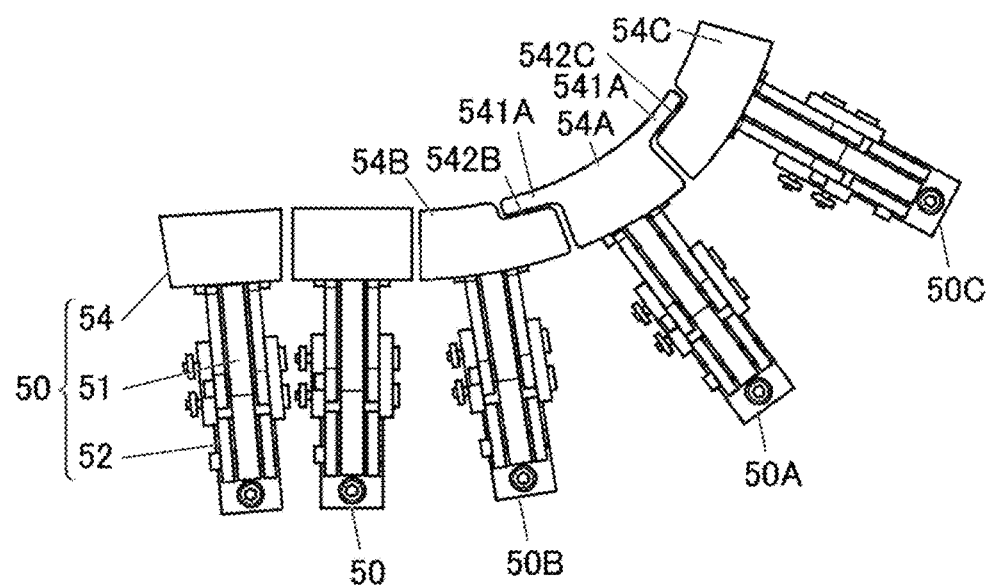
FIG. 11 is a plan view of a state where every switching mechanism is in operation after installation.

FIG. 8 is a side view illustrating a state where the switching mechanism 50 is on standby before a position switching operation is executed with respect to the attachment piece 30. FIG. 9 is a plan view of a state where every switching mechanism 50, 50A, 50B, and 50C is on standby after installation. FIG. 10 is a side view illustrating a state where the switching mechanism 50 is in operation after the position switching operation is executed with respect to the attachment piece 30. FIG. 11 is a plan view of a state where every switching mechanism 50, 50A, 50B, and 50C is in operation after installation.

It is to be noted that the direction toward the attachment piece 30 is defined as "front", the direction away from the attachment piece 30 is defined as "rear", and these definitions are limited to the description of the switching mechanisms 50, 50A, 50B, and 50C.

The switching mechanism 50 has an abutting body 54 abutting against the pivoting portions 31 of the plurality of attachment pieces 30 during position switching, a pivoting imparting member 51 performing a pivoting imparting operation to pivot the pivoting portions 31 of the plurality of attachment pieces 30 via the abutting body 54, an air cylinder 52 as an actuator serving as a drive source for the pivoting imparting operation, a transmission mechanism 53 converting the advancing and retracting motion of the air cylinder 52 into the predetermined pivoting imparting operation and transmitting the pivoting imparting operation to the pivoting imparting member 51, and a base portion 55 as an adsorption portion holding the switching mechanism 50 at any position on the mounting surface H.

The abutting body 54 presses and pivots the pivoting portion 31 of the attachment piece 30 in the front tip portion thereof. The width of the tip portion of the abutting body 54 is at least several times the width of the pivoting portion 31 such that the abutting body 54 is capable of simultaneously pivoting the pivoting portions 31 of the plurality of attachment pieces 30. It is to be noted that at an excessively large width, it is difficult to cope with a case where the plurality of pivoting portions 31 are arranged in a curved shape, and thus the width of the abutting body 54 is preferably in the range of approximately twice to 20 times.

The abutting body 54 abuts from below against the pressure receiving surface 312 of the pivoting portion 31 that is at the deployment position, ascends while advancing toward the placement surface 21 side, and turns downward while moving forward from the middle. As a result, the pivoting portion 31 can be pivoted from the deployment position to the facing position.

The pivoting imparting member 51 is a plate-shaped body elongated along the front-rear direction and is integrally connected to the abutting body 54 in the tip portion thereof.

The pivoting imparting member 51 has an arch shape in which the front half is convex upward in side view, and the rear half extends straight.

The air cylinder 52 has a main body portion having a substantially rectangular parallelepiped shape that is small in breadth as a whole and having a cylinder inside, two plungers 521 along the up-down direction, a support base 522 supporting the pivoting imparting member 51 and the transmission mechanism 53, and a standing portion 523 extending upward from the front side of the upper end portion of the main body portion.

The support base 522 is connected to the upper end portions of the two plungers 521, and an ascending and descending motion is input from the plunger 521.

The transmission mechanism 53 includes first to third link members 531 to 533 and converts the ascending motion of the air cylinder 52 into an upward and downward motion entailing forward movement by the abutting body 54. It is to be noted that each of the first to third link members 531 to 533 is connected so as to be pivotable around an axis along the horizontal direction that is orthogonal to the forward movement direction of the abutting body 54. In addition, the first to third link members 531 to 533 are provided in pairs on both sides with the pivoting imparting member 51 interposed therebetween.

One end portion of the first link member 531 is connected to the rear portion of the upper surface of the support base 522 (end portion side away from the attachment piece 30), and the other end portion is connected to the rear end portion of the pivoting imparting member 51.

One end portion of the second link member 532 is connected to the upper end portion of the standing portion 523, and the other end portion is connected to the intermediate portion of the pivoting imparting member 51 in the front-rear direction.

One end portion of the third link member 533 is connected to the front portion of the upper surface of the support base 522 (attachment piece 30 side), and the other end portion is connected to the vicinity of the other end portion of the second link member 532.

The first to third link members 531 to 533 configure a five-joint link mechanism with the pivoting imparting member 51 added.

As a result of the above configuration of the transmission mechanism 53, when the plunger 521 of the air cylinder 52 pushes up the support base 522, the third link member 533 pushes up the second link member 532 and causes upward and downward pivoting as illustrated in FIGS. 8 and 10. As a result, a forward motion is imparted to the pivoting imparting member 51.

Meanwhile, the first link member 531 is pivoted upward and downward by the forward movement of the pivoting imparting member 51 to push up the rear end portion of the pivoting imparting member 51. At the start of the forward movement, the amount of ascent of the second link member 532 is greater than the amount of ascent by the first link member 531, and the pivoting imparting member 51 moves upward while the end portion on the abutting body 54 side moves forward.

Further, since the third link member 533 is connected to the second link member 532, when the plunger 521 of the air cylinder 52 pushes up the support base 522, the amount of ascent of the first link member 531 exceeds the amount of ascent of the second link member 532 while the upward and downward pivoting is limited, and the pivoting imparting member 51 turns to downward movement while the end portion on the abutting body 54 side moves forward.

Therefore, at the deployment position, the abutting body 54 abutting from below the pressure receiving surface 312 of the pivoting portion 31 of the attachment piece 30 that faces downward is capable of pushing up and pivoting forward the pressure receiving surface 312 to switch to the facing position and, further, pressing the pivoting portion 31 downward via the pressure receiving surface 312.

The base portion 55 is connected to the air cylinder 52 via a connecting bracket 551 or 552. The base portion 55 itself is adsorbed to the mounting surface H to support the air cylinder 52 such that a state where the air cylinder 52 is erected at any position on the mounting surface H is maintained.

Although the base portion 55 may be adsorbable to the mounting surface H using pneumatic pressure, a structure in which a permanent magnet is incorporated and adsorption to the mounting surface H as a magnetic body is performed by magnetic force is exemplified here. The base portion 55 includes an operation portion (not illustrated) such as a handle and a knob capable of changing the orientation and position of the incorporated permanent magnet and has a structure switchable between an adsorbable state and a non-adsorption state.

It is to be noted that the connecting bracket 551 or 552 is selectively used in accordance with the disposition of the switching mechanisms 50 and so on. For example, the connecting bracket 551 has the function of connecting the base portion 55 to the side surface portion of the air cylinder 52, and the connecting bracket 552 has the function of connecting the base portion 55 to the rear of the air cylinder 52.

As illustrated in FIG. 7, the switching mechanisms 50 and so on may be disposed side by side so as to be dense. Even in the dense disposition, the connecting bracket 551 is used in a case where a space is present next to the air cylinder 52 to dispose the base portion 55 and the connecting bracket 552 is used in the absence of the space.

The switching mechanisms 50A, 50B, and 50C are provided with abutting bodies 54A, 54B, and 54C, which are different in form from the abutting body 54 of the switching mechanism 50 described above.

The switching mechanism 50A is disposed so as to face the center of the curved part that is convex to the outside of the end edge portion 22 of the placement surface 21 of the placement base 20, and the switching mechanisms 50B and 50C are disposed on both sides thereof.

As illustrated in FIGS. 9 and 11, the abutting body 54A of the switching mechanism 50A is provided with angular projecting portions 541A, which are on both left and right sides of the front tip portion thereof and widen the tip portion. The width of projection of each projecting portion 541A is set smaller than the width of the projecting portion-less abutting body 54 (for example, approximately half of the width of the abutting body 54).

Meanwhile, the abutting body 54B of the switching mechanism 50B disposed on the left side of the switching mechanism 50A is formed with a notch portion 542B, which is at the right side part of the front tip portion thereof and has a shape in which the projecting portion 541A on the left side fits. Likewise, the abutting body 54C of the switching mechanism 50C disposed on the right side of the switching mechanism 50A is formed with a notch portion 542C, which is at the left side part of the front tip portion thereof and has a shape in which the projecting portion 541A on the right side fits. The width of each of the notch portions 542B and 542C is set substantially equal to the width of one projecting portion 541A.

When the pivoting portion 31 of each attachment piece 30 (not illustrated in FIG. 9) is at the deployment position, each of the switching mechanisms 50A, 50B, and 50C is disposed such that the pre-forward movement abutting bodies 54A, 54B, and 54C have certain gaps in the left-right direction as illustrated in FIG. 9.

Then, when the pivoting portion 31 of each attachment piece 30 (not illustrated in FIG. 11) is pushed into the facing position, each of the switching mechanisms 50A, 50B, and 50C is disposed such that the post-forward movement abutting bodies 54A, 54B, and 54C are almost gapless in the left-right direction as illustrated in FIG. 11. At this time, the left and right projecting portions 541A of the abutting body 54A almost gaplessly fit into the notch portions 542B and 542C of the left and right abutting bodies 54B and 54C.

In a case where only the normal switching mechanism 50 is disposed with respect to the curve that is convex to the outside of the end edge portion 22 of the placement surface 21 of the placement base 20, the plurality of abutting bodies 54 need to be disposed in advance so as to have gaps in the left-right direction such that the plurality of abutting bodies 54 that have performed forward movement do not interfere. Then, the attachment piece 30 on which no position switching is performed can be made by the gap.

On the other hand, as for the switching mechanisms 50A, 50B, and 50C, the gap is eliminated by the projecting portion 541A of the abutting body 54A. In addition, although gaps are generated between the tip portions of the projecting portions 541A of the abutting body 54A and the tip portions of the abutting bodies 54B and 54C other than the notch portions 542B and 542C before forward movement is performed, the inner edge portions of the notch portions 542B and 542C pivot the pivoting portion 31 and position switching can be performed even in a case where the pivoting portion 31 of the attachment piece 30 is positioned in the gap.

It is to be noted that preferably, the thickness of the projecting portion 541A in the front-rear direction and the depth of each of the notch portions 542B and 542C in the front-rear direction are small.

Joining Operation

The joining operation by the joining apparatus 100 will be described with reference to FIGS. 12A to 15B, which are side views of the surroundings of the attachment piece 30, and FIGS. 16A to 18, which are plan views of the surroundings of the placement base 20.

Figure 12A:
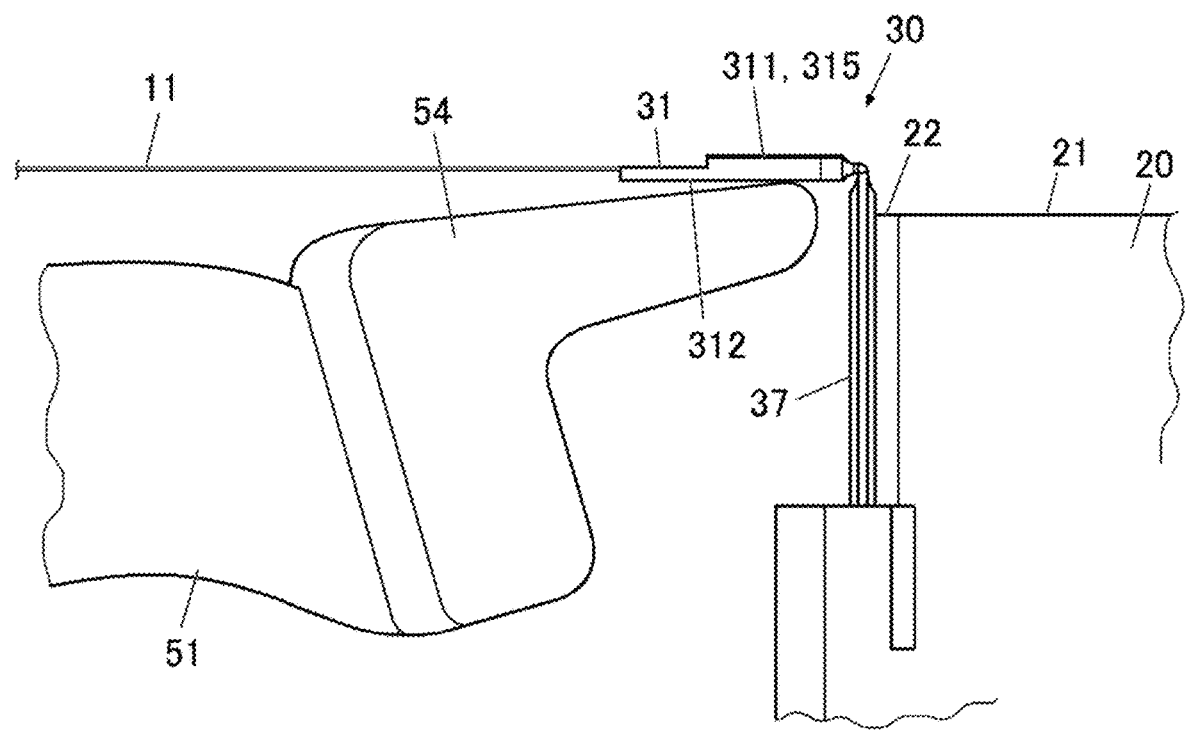
FIG. 12A is a side view of the surroundings of the attachment piece during a joining operation by the joining apparatus.
Figure 16A:
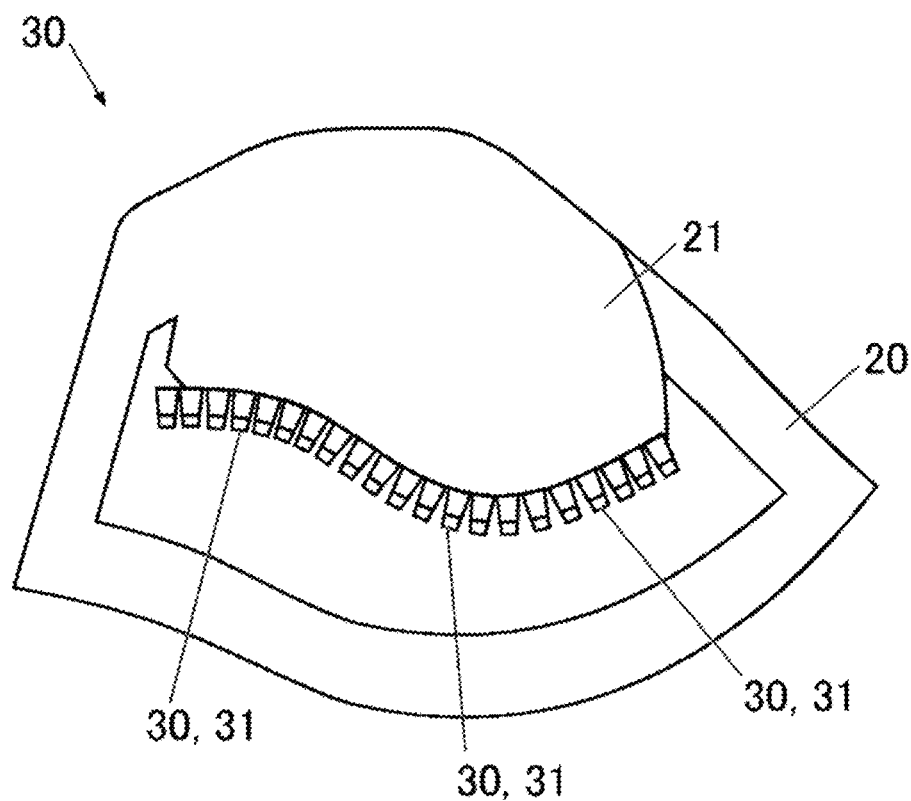
FIG. 16A is a plan view of the surroundings of the placement base during the joining operation by the joining apparatus.

First, as illustrated in FIGS. 12A and 16A, with the pivoting portion 31 of each attachment piece 30 at the deployment position, an adhesive layer 315 is formed on the attachment surface 311 of each pivoting portion 31 by double-sided tape affixing. The adhesive layer 315 may be formed by adhesive application.

Figure 12B:
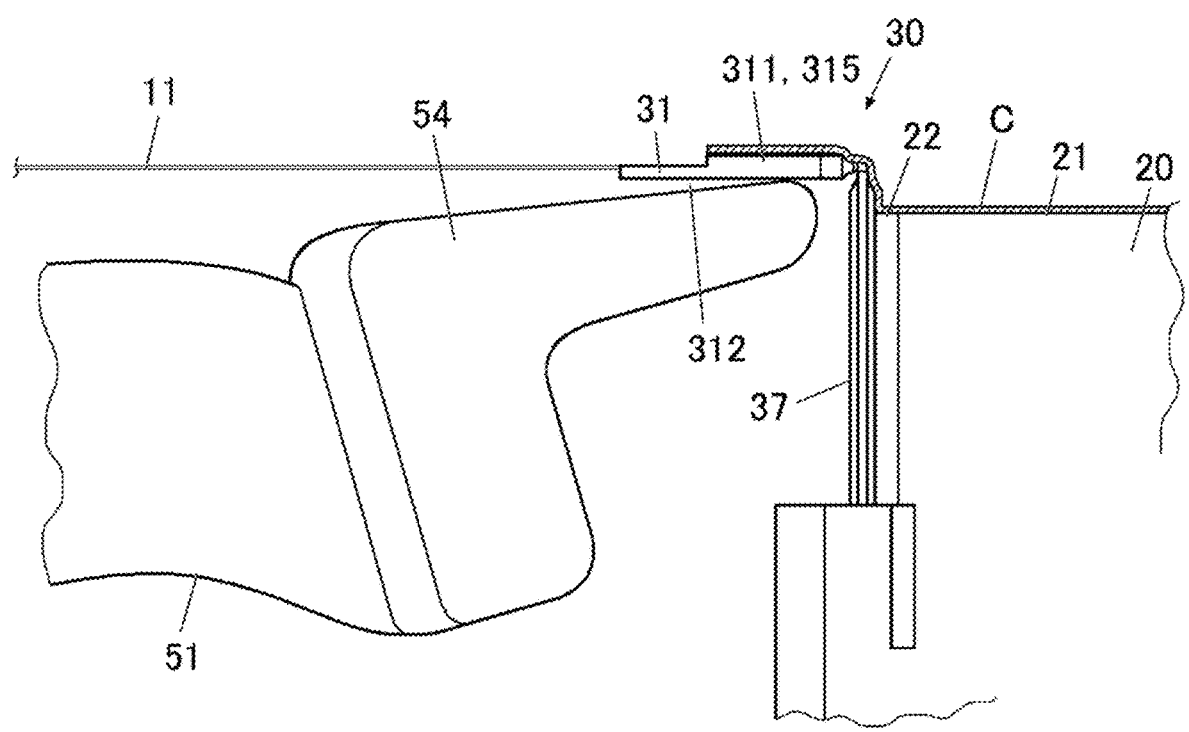
FIG. 12B is a side view of the surroundings of the attachment piece during the joining operation following FIG. 12A.
Figure 16B:
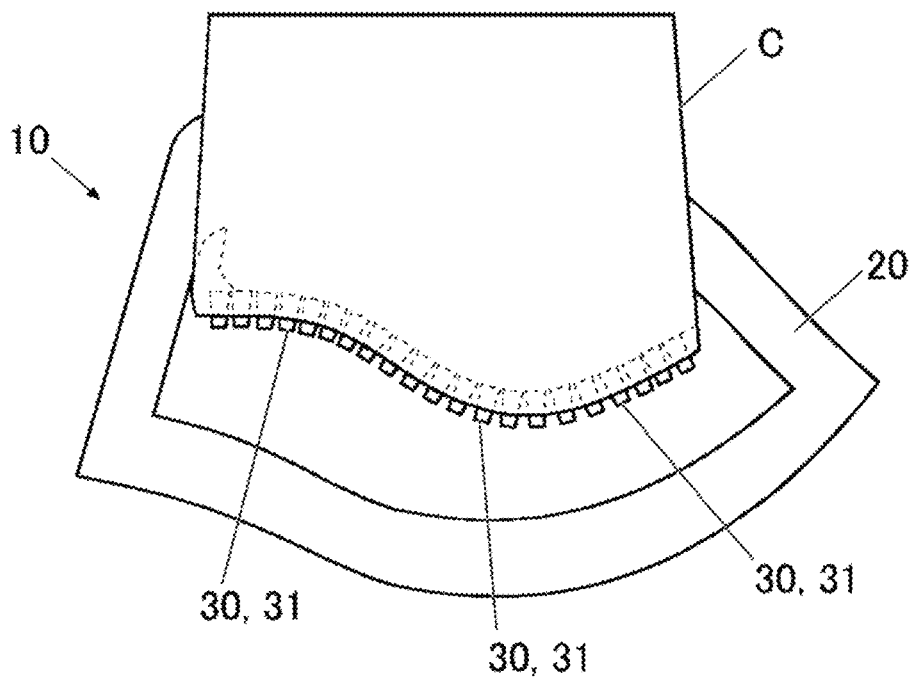
FIG. 16B is a plan view of the surroundings of the placement base during the joining operation following FIG. 16A.

Next, as illustrated in FIGS. 12B and 16B, the adherend C is placed on the placement surface 21 of the placement base 20. At this time, the end edge portion C1 of the adherend C is positioned on the step 314 (see FIG. 5A to 5C) of the pivoting portion 31 of each attachment piece 30 and affixed to the adhesive layer 315 of the attachment surface 311. In addition, the adherend C is placed on the placement surface 21 along the front surfaces of the bent portion 36 and the support portion 37 from the attachment surface 311.

Figure 13A:
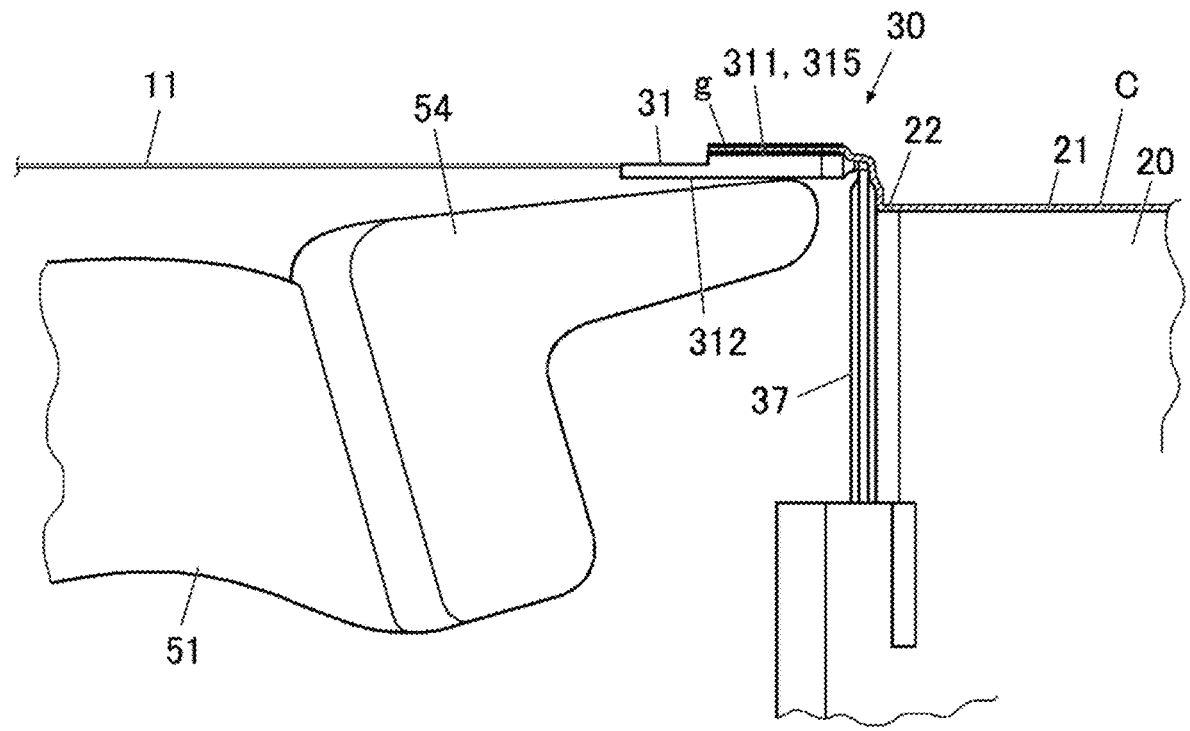
FIG. 13A is a side view of the surroundings of the attachment piece during the joining operation following FIG. 12B.

Next, as illustrated in FIG. 13A, an adhesion layer g is formed by applying an adhesive to the surface part of the adherend C that is outside the bent portion 36 in each attachment piece 30 and on the side opposite to the surface attached to the attachment surface 311. Although any adhesive may be used insofar as the adherend C and the sheet-shaped material S are adherable, it is preferable to use an adhesive that cannot be easily peeled off after adhesion. For example, a reactive hot-melt adhesive can be used as the adhesive.

Figure 13B:
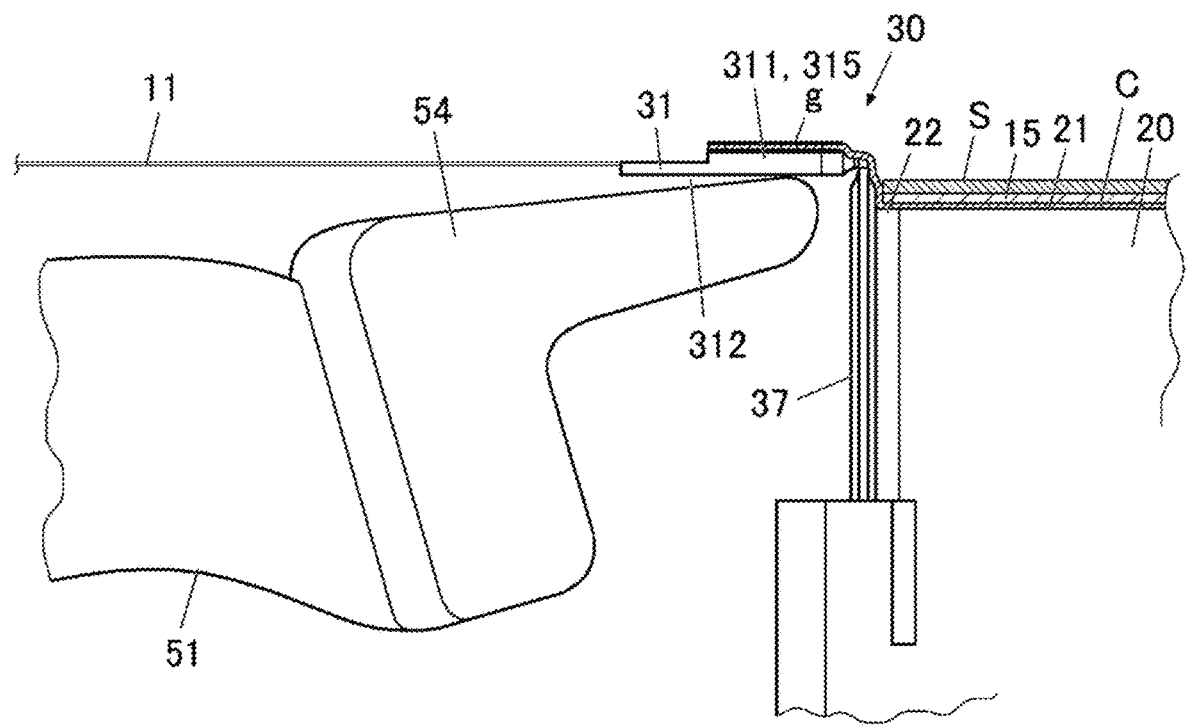
FIG. 13B is a side view of the surroundings of the attachment piece during the joining operation following FIG. 13A.

Next, as illustrated in FIGS. 13B and 17A, the sheet-shaped material S is placed on the placement surface 21 of the placement base 20 so as to be superimposed on the adherend C. At this time, the end edge portion S1 of the sheet-shaped material S is positioned and placed on the end edge portion 22 of the placement surface 21.

It is to be noted that a fixing plate 15 is interposed (not illustrated in FIG. 17A) between the adherend C and the sheet-shaped material S. The end edge portion of the fixing plate 15 may match the shape of the end edge portion S1 of the sheet-shaped material S. The fixing plate 15 is more rigid than the sheet-shaped material S and is capable of supporting the sheet-shaped material S and the adherend C in a form-fixed state.

Figure 14A:
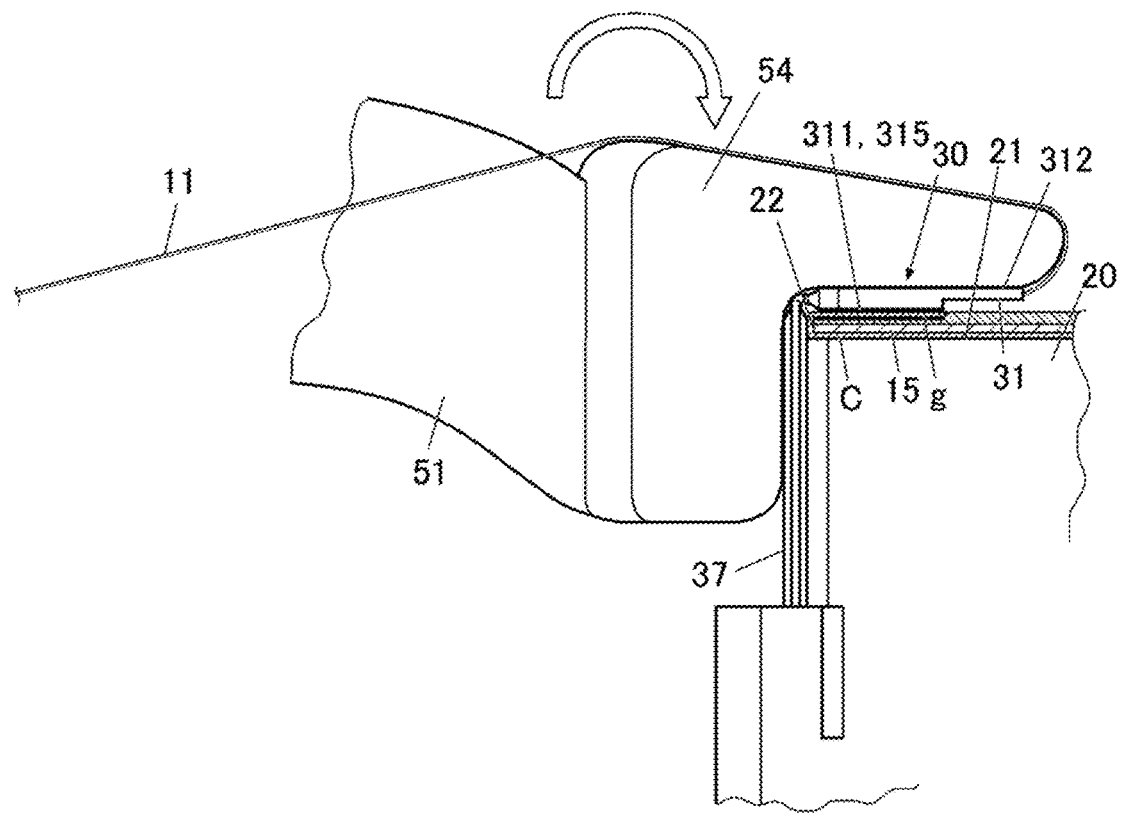
FIG. 14A is a side view of the surroundings of the attachment piece during the joining operation following FIG. 13B.

Next, as illustrated in FIGS. 14A and 17B, each of the switching mechanisms 50 and so on moves the pivoting imparting member 51, the abutting body 54, and so on at the retraction position forward by the protruding motion of the plunger 521 of the air cylinder 52.

As described above, the pivoting imparting member 51 and the abutting body 54 ascend and then turn downward during forward movement, and thus each of the switching mechanisms 50 and so on pivots the pivoting portion 31 of each attachment piece 30 from the deployment position to the facing position. As a result, the end edge portion C1 of the adherend C is folded back to the back surface side in the end edge portion S1 of the sheet-shaped material S, and the adhesion layer g is pressed against and adheres to the back surface side in the end edge portion S1 of the sheet-shaped material S.

Each of the switching mechanisms 50 and so on may maintain the forward movement states of the pivoting imparting member 51, the abutting body 54, and so on for a certain period of time to wait until strength is ensured for the adhesion of the end edge portion C1 of the adherend C to the end edge portion S1 of the sheet-shaped material S by the adhesion layer g.

Figure 14B:
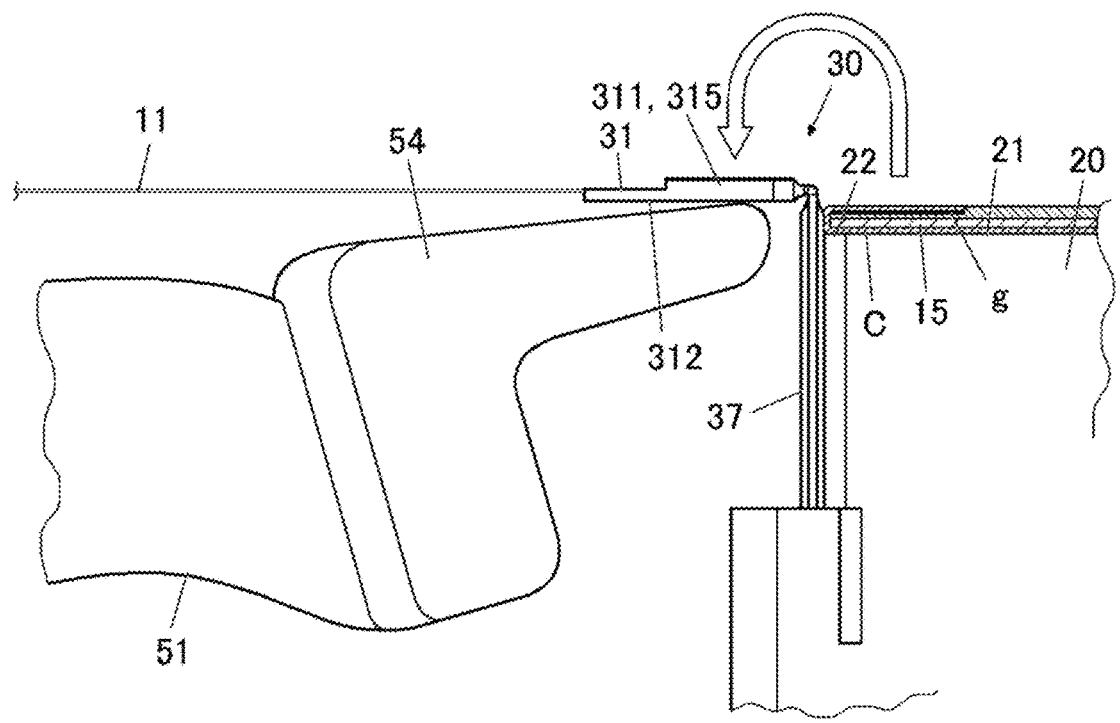
FIG. 14B is a side view of the surroundings of the attachment piece during the joining operation following FIG. 14A.

Next, as illustrated in FIG. 14B, each of the switching mechanisms 50 and so on retracts the plunger 521 of the air cylinder 52 to retract the pivoting imparting member 51, the abutting body 54, and so on. As a result, the pivoting portion 31 of each attachment piece 30 is pivoted by the tension of the rubber cord 11 and returns from the facing position to the deployment position. Since the end edge portion C1 of the adherend C is attached to the sheet-shaped material S, the adhesive layer 315 of the attachment surface 311 of the pivoting portion 31 of each attachment piece 30 peels off the end edge portion C1 of the adherend C.

Figure 15A:
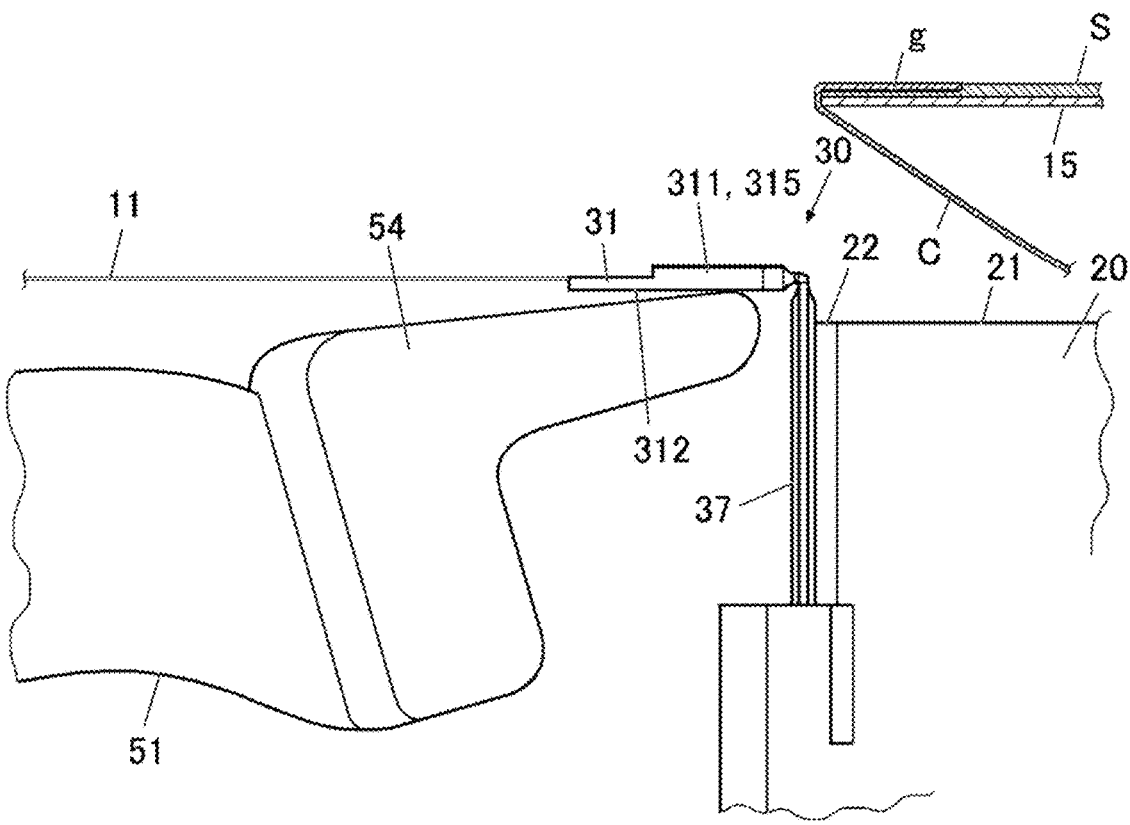
FIG. 15A is a side view of the surroundings of the attachment piece during the joining operation following FIG. 14B.
Figure 18:
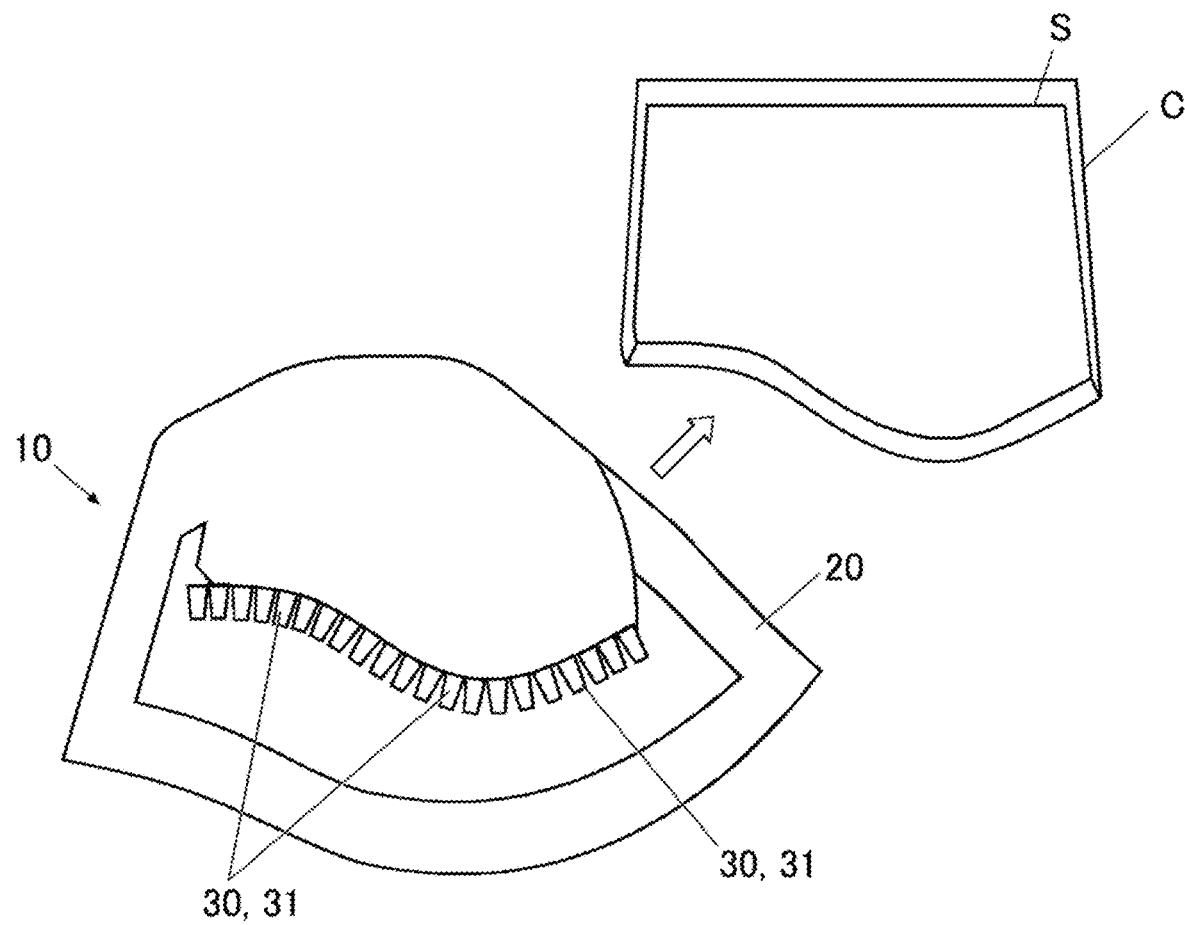
FIG. 18 is a plan view of the surroundings of the placement base during the joining operation following FIG. 17B.

Next, as illustrated in FIGS. 15A and 18, the sheet-shaped material S with the adherend C attached to the end edge portion S1 is removed from the placement surface 21 of the placement base 20.

Figure 15B:
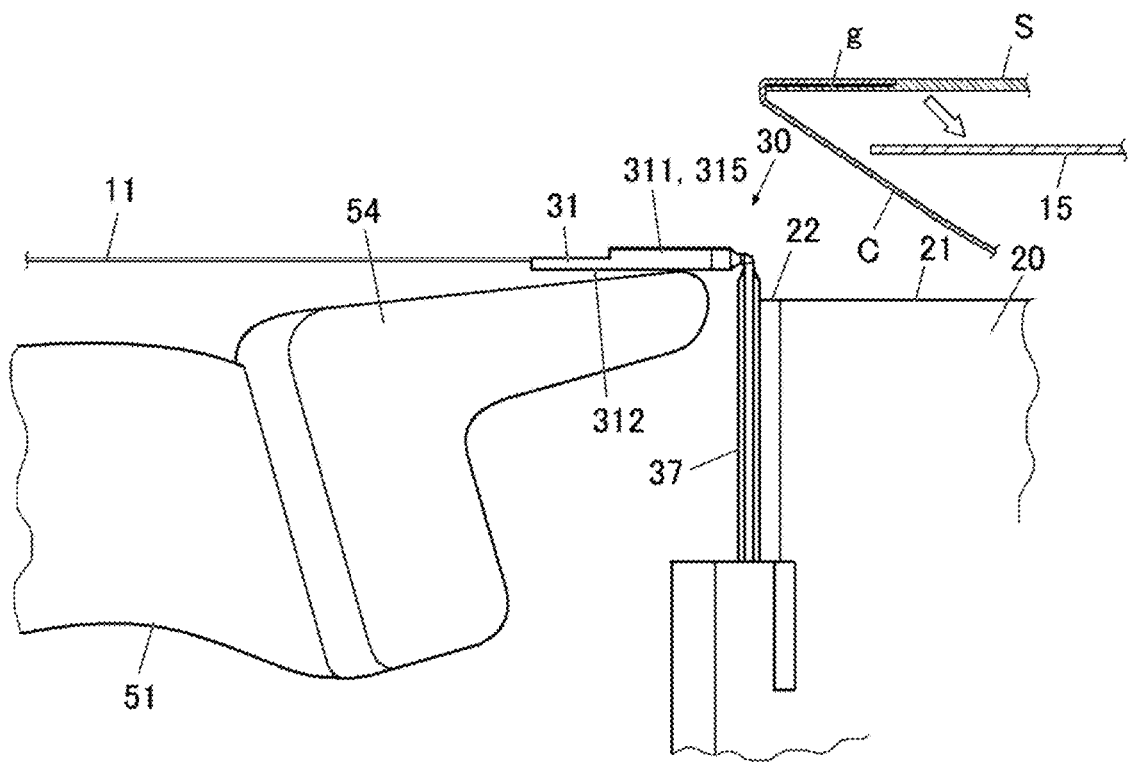
FIG. 15B is a side view of the surroundings of the attachment piece during the joining operation following FIG. 15A.

Further, as illustrated in FIG. 15B, the joining work ends by taking out the fixing plate from between the sheet-shaped material S and the adherend C.

Technical Effect of Embodiment of Invention

As for the joining apparatus 100, the joining jig 10 includes the placement base 20 where the end edge portion 22 of the placement surface 21 is formed in a shape corresponding to the end edge portion S1 of the sheet-shaped material S and the plurality of attachment pieces 30 to which the adherend C is attached, which are disposed side by side along the end edge portion 22 of the placement base 20. By the tip portion of each attachment piece 30 pivoting in the end edge portion 22 of the placement surface 21 of the placement base 20, each attachment piece 30 is switchable between the deployment position where the attachment surface 311 to which the adherend C is attached is deployed outside the end edge portion 22 of the placement surface 21 of the placement base 20 and the facing position where the attachment surface 311 faces the end edge portion 22 of the placement surface 21.

As a result, the end edge portion C1 of the adherend C is attached to the attachment surface 311 of the attachment piece 30 and an adhesive can be easily applied to the end edge portion C1 of the adherend C.

Further, by positioning the end edge portion S1 of the sheet-shaped material S in the end edge portion 22 of the placement surface 21 of the placement base 20 and pivoting the tip portion of the attachment piece 30, the end edge portion C1 of the adherend C can be easily folded back along the end edge portion S1 of the sheet-shaped material S and, even in a case where the end edge portion S1 is not linear, the end edge portion C1 of the adherend C can be easily attached to the back surface of the end edge portion S1 of the sheet-shaped material S.

In other words, with the joining apparatus 100, it is possible to facilitate the work of folding back the adherend C and attaching the adherend C along the end edge portion 51 of the sheet-shaped material S.

In addition, the joining jig 10 is provided with the rubber cord 11 pivoting the attachment piece 30 to the deployment position side. As a result, after the adherend C is folded back and attached along the end edge portion S1 of the sheet-shaped material S, the tip portion of the attachment piece 30 can be returned to the deployment position by the tension of the rubber cord 11 and the burden of the returning work can be reduced.

In addition, the attachment piece 30 is configured to have the pivoting portion 31 having the attachment surface 311 and the support portion 37 attached to the placement base 20. As a result, the attachment piece 30 can be attached to and removed from the placement base 20.

The placement base 20 needs to be made with the shape of the end edge portion 22 matching the shape of the end edge portion 51 of the sheet-shaped material S, and thus a new joining jig 10 needs to be made during use for joining the end edge portion 51 of the sheet-shaped material S that is different in shape, and yet the attachment piece 30 is removable and thus reattachable to the new joining jig 10.

In addition, the pivoting portion 31 can be pivoted since the attachment piece 30 has the constricted bent portion 36 at the boundary between the pivoting portion 31 and the support portion 37. Further, since the bent portion 36 is a constriction, the bent portion 36 is thinner than the pivoting portion 31 and the support portion 37, and thus the slackness of the adherend C can be reduced and satisfactory joining can be performed in a case where pivoting to the facing position is performed with the adherend C disposed so as to be along the attachment piece 30 at the deployment position.

In addition, as for the joining jig 10, the support portions 37 of the plurality of attachment pieces 30 arranged along the end edge portion 22 of the placement base 20 are integrally connected via the groove-shaped flexible portions 38. As a result, in attaching the plurality of attachment pieces 30 to the placement base 20, disposition along the end edge portion 22 can be performed very easily and the burden of the joining work can be further reduced.

In addition, the joining apparatus 100 includes the switching section that switches the plurality of attachment pieces 30 between the deployment position and the facing position, and thus there is no need to manually fold back the end edge portion C1 of the adherend C and the burden of the joining work can be further reduced.

In addition, the switching section performs the work of pressurizing the attachment surface 311 at the facing position to the placement surface 21 side in addition to position switching with respect to the plurality of attachment pieces 30. As a result, it is possible to perform the operation of pressing against the end edge portion S1 of the sheet-shaped material S and joining as well as folding back the end edge portion C1 of the adherend C, and the burden of the joining work can be further reduced.

In addition, the plurality of switching mechanisms 50 and so on of the switching section are provided and each of the switching mechanisms 50 and so on is capable of executing position switching with respect to the plurality of attachment pieces 30 successively arranged as one unit. As a result, it is possible to reduce the number of required switching mechanisms 50 and so on and reduce the manufacturing cost and size of the apparatus. Alternatively, the count of the attachment pieces 30 can be increased with respect to the count of the switching mechanisms 50 and so on to reduce the width of the attachment pieces 30 and densely dispose the attachment pieces 30. Then, the end edge portion C1 of the adherend C can be folded back so as to be closer to the shape of the end edge portion S1 with respect to a change such as bending of the end edge portion S1 of the sheet-shaped material S, and more satisfactory joining can be implemented.

In addition, the switching mechanisms 50 and so on of the plurality of switching sections are provided with the base portion 55 capable of switching between the adsorption state and the release state with respect to the mounting surface H. As a result, each of the switching mechanisms 50 and so on is attachable at any position on the mounting surface H, the position of pivoting of the attachment piece 30 can be switched with respect to various shapes of the end edge portion S1 of the sheet-shaped material S, and satisfactory joining can be implemented with respect to various shapes of the end edge portion S1 of the sheet-shaped material S.

In addition, the switching mechanism 50A of a part of the switching section has the abutting body 54A provided with the projecting portion 541A widening the tip portion abutting against the attachment piece 30, and the switching mechanisms 50B and 50C of another part of the switching section have the abutting bodies 54B and 54C provided with the notch portions 542B and 542C in the tip portions abutting against the attachment piece 30 to avoid interference with the projecting portion 541A.

By disposing the switching mechanisms 50A, 50B, and 50C so as to face the curved portion of the end edge portion 22 of the joining jig 10, it is possible to reduce the attachment pieces 30 that cause poor position switching due to the gaps resulting from the forward and backward movement of each of the abutting bodies 54A, 54B, and 54C, and more satisfactory joining can be implemented.

Others

The above details described in the embodiment can be changed as appropriate without departing from the spirit of the invention.

For example, although the switching mechanisms 50A, 50B, and 50C in the above example are disposed so as to face the part where the shape of the end edge portion 22 of the joining jig 10 is convex to the outside, the switching mechanisms 50A, 50B, and 50C may be disposed so as to face a part where the shape is concave from the outside.

As for the switching mechanisms 50A, 50B, and 50C in this case, each of the abutting bodies 54A, 54B, and 54C is disposed such that the gaps between the projecting portion 541A and the notch portions 542B and 542C decrease at the retraction position and increase at the forward movement position. Also in this case, the pivoting portion 31 of each attachment piece 30 can be pivoted satisfactorily.

What is claimed is:

1. A joining jig configured to join a sheet-shaped adherend on a sheet-shaped material, the joining jig comprising:
   a placement base including a placement surface on which the sheet-shaped material is configured to be placed and to be superimposed on the sheet-shaped adherend, wherein an end edge portion of the placement surface is formed in a shape corresponding to an end edge portion of the sheet-shaped material; and
   a plurality of attachment pieces configured to have the sheet-shaped adherend attached, the plurality of attachment pieces disposed side by side along the end edge portion of the placement base, and each attachment piece of the plurality of attachment pieces including a tip portion that pivots and an attachment surface configured to be attached to the sheet-shaped adhered,
   wherein each attachment piece of the plurality of attachment pieces is switchable between a deployment position and a facing position by pivoting the tip portion of each attachment piece adjacent to the end edge portion of the placement surface of the placement base, and
   when the sheet-shaped material is superimposed on the sheet-shaped adhered on the placement surface, the joining jig is configured to fold back the sheet-shaped adherend over the end portion of the sheet-shaped material and adhere the sheet-shaped adherend to the sheet-shaped material by switching from the deployment position to the facing position, and
   in the deployment position the attachment surface of each attachment piece extends away from the end edge portion of the placement surface so that the sheet-shaped adherend is in an unfolded position when adhered to the attachment surface of each attachment piece, and
   in the facing position the attachment surface of each attachment piece faces the placement surface so that, when adhered to the attachment surface of each attachment piece during switching, the sheet-shaped adherend is folded back and adhered over the sheet-shaped material.

2. The joining jig according to claim 1, further comprising:
   a biasing section that pivots each attachment piece of the plurality of attachment pieces to the deployment position.

3. The joining jig according to claim 1, wherein each attachment piece of the plurality of attachment pieces includes i) a pivoting portion having the tip portion and the attachment surface of the attachment piece and ii) a support portion attached to the placement base.

4. The joining jig according to claim 3, wherein each attachment piece of the plurality of attachment pieces includes a bent portion formed at a boundary between the pivoting portion and the support portion, the bent portion enabling pivoting of the pivoting portion.

5. The joining jig according to claim 3, wherein
   in the plurality of attachment pieces disposed along the end edge portion of the placement base, the support portion of each attachment piece of the plurality of attachment pieces is integrally connected to the support portion of an adjacent attachment piece of the plurality of attachment pieces via a groove-shaped flexible portion formed at a boundary between the support portions, and the plurality of attachment pieces are attachable to the placement base via the groove-shaped flexible portion to follow a shape of the end edge portion of the placement base.

6. A joining apparatus comprising:
   the joining jig according to claim 1; and
   a switching section that switches the plurality of attachment pieces of the joining jig between the deployment position and the facing position.

7. The joining apparatus according to claim 6, wherein the switching section pressurizes the attachment surface of each attachment piece of the plurality of attachment pieces at the facing position to a placement surface side in addition to position switching with respect to the plurality of attachment pieces.

8. The joining apparatus according to claim 6, wherein the switching section comprises a plurality of switching sections, wherein each of the plurality of switching sections executes the switching of the plurality of attachment pieces.

9. The joining apparatus according to claim 8, wherein each of the plurality of switching sections includes an adsorption portion capable of switching between an adsorption state and a release state to enable releasable attachment at any position on a mounting surface.

10. The joining apparatus according to claim 8, wherein
- each of the plurality of switching sections have an abutting body having a tip portion for abutting against at least one of the plurality of attachment pieces to perform switching from the deployment position to the facing position,
- the abutting body of some the plurality of switching sections is provided with a projecting portion widening the tip portion, and
- the abutting body of others of the plurality of switching sections has a notch portion in the tip portion to avoid interference with the projecting portion.

* * * * *